US012149032B2

(12) United States Patent
White et al.

(10) Patent No.: US 12,149,032 B2
(45) Date of Patent: Nov. 19, 2024

(54) CONNECTOR ASSEMBLY WITH GROUNDING

(71) Applicant: CommScope Technologies LLC, Hickory, NC (US)

(72) Inventors: Gordon John White, Gloucester (GB); Shawn Phillip Tobey, Trinity, NC (US); Brian J. Fitzpatrick, McKinney, TX (US)

(73) Assignee: CommScope Technologies LLC, Hickory, NC (US)

( * ) Notice: Subject to any disclaimer, the term of this patent is extended or adjusted under 35 U.S.C. 154(b) by 92 days.

(21) Appl. No.: 17/843,502

(22) Filed: Jun. 17, 2022

(65) Prior Publication Data

US 2022/0393412 A1 Dec. 8, 2022

Related U.S. Application Data

(63) Continuation of application No. 17/018,690, filed on Sep. 11, 2020, now Pat. No. 11,367,985, which is a (Continued)

(51) Int. Cl.
*H01R 24/00* (2011.01)
*H01R 13/52* (2006.01)
(Continued)

(52) U.S. Cl.
CPC ......... *H01R 24/64* (2013.01); *H01R 13/5213* (2013.01); *H01R 13/6275* (2013.01);
(Continued)

(58) Field of Classification Search
CPC .......... H01R 13/65917; H01R 13/5213; H01R 13/6275; H01R 13/6592; H01R 24/64; H01R 43/18
(Continued)

(56) References Cited

U.S. PATENT DOCUMENTS 3,474,385 A * 10/1969 Cefarelli ............ H01R 13/6473 439/295
3,666,996 A 5/1972 Brown
(Continued)

FOREIGN PATENT DOCUMENTS

CN 101095264 A 12/2007
CN 101510649 A 8/2009
(Continued)

OTHER PUBLICATIONS

Extended European Search Report for Application No. 17841856.2 dated Feb. 19, 2020.
(Continued)

*Primary Examiner* — Abdullah A Riyami
*Assistant Examiner* — Vladimir Imas
(74) *Attorney, Agent, or Firm* — Merchant & Gould P.C.

(57) ABSTRACT

A connector assembly (10) is disclosed in which a connector part (12) and a cable manager part (20) are provided. The cable manager part (20) can be provided with a rear housing (40), a lacing fixture part (30), and a grounding part (50). In one aspect, the grounding part (50) provides grounding contact between an inserted cable (4) and the connector part (12). In one aspect, the grounding part (50) secures the connector part (12) to the rear housing part (40). In one example, a connector assembly (110) is provided with a grounding arrangement (150) including a plurality of deflectable grounding members (152) and provides grounding contact between the inserted cable (4) and the connector part (112). In one aspect, the grounding members (152) each provide two points of contact against the cable (4).

14 Claims, 24 Drawing Sheets

Related U.S. Application Data continuation of application No. 16/326,055, filed as application No. PCT/US2017/045539 on Aug. 4, 2017, now Pat. No. 10,777,953.

(60) Provisional application No. 62/521,952, filed on Jun. 19, 2017, provisional application No. 62/375,260, filed on Aug. 15, 2016, provisional application No. 62/375,269, filed on Aug. 15, 2016.

(51) Int. Cl.
*H01R 13/627* (2006.01)
*H01R 13/6591* (2011.01)
*H01R 13/6592* (2011.01)
*H01R 24/64* (2011.01)
*H01R 43/18* (2006.01)

(52) U.S. Cl.
CPC ... *H01R 13/65917* (2020.08); *H01R 13/6592* (2013.01); *H01R 43/18* (2013.01)

(58) Field of Classification Search
USPC .......................................................... 439/676
See application file for complete search history.

(56) References Cited

U.S. PATENT DOCUMENTS 3,739,076 A 6/1973 Schwartz
3,830,957 A 8/1974 Oberdier
4,284,316 A 8/1981 Debaigt
4,537,458 A 8/1985 Worth
4,660,912 A 4/1987 Tomek
4,679,879 A 7/1987 Triner et al.
4,721,476 A 1/1988 Zeliff et al.
4,747,785 A 5/1988 Roberts et al.
4,760,215 A 7/1988 Cook et al.
4,790,765 A 12/1988 Ehrenfels et al.
4,810,210 A 3/1989 Komatsu
4,824,400 A 4/1989 Spinner
4,830,628 A 5/1989 Dyson et al.
4,842,553 A 6/1989 Ingram
4,857,015 A 8/1989 Michaels et al.
5,021,610 A 6/1991 Roberts
5,074,803 A * 12/1991 Chandler ........... H01R 13/6275 439/372
5,169,346 A * 12/1992 Johnston ................ H01R 24/84 439/607.31
5,238,416 A 8/1993 Dickie
5,240,436 A 8/1993 Bradley
5,278,352 A 1/1994 Schade
5,310,359 A 5/1994 Chadbourne et al.
5,445,538 A 8/1995 Rodrigues et al.
5,571,023 A 11/1996 Anthony
5,675,126 A 10/1997 Halvorsen
5,691,506 A 11/1997 Miyazaki et al.
5,697,806 A 12/1997 Whiteman, Jr.
5,762,517 A 6/1998 Abe
5,769,647 A * 6/1998 Tulley .................... H01R 24/64 439/144
6,015,307 A 1/2000 Chiu et al.
6,077,122 A 6/2000 Elkhatib
6,086,415 A 7/2000 Sanchez et al.
6,244,908 B1 6/2001 Hammond
6,247,849 B1 6/2001 Liu
6,254,403 B1 7/2001 Bernardini
6,292,564 B1 9/2001 Cowan et al.
6,354,851 B1 3/2002 Bachle
6,386,915 B1 5/2002 Nelson
6,394,853 B1 5/2002 Hammond
6,425,694 B1 7/2002 Szilagyi et al.
6,520,781 B2 2/2003 Koide et al.
6,537,104 B1 3/2003 Hagmann et al.
6,612,750 B1 9/2003 Bull et al.
6,652,152 B2 11/2003 Yang et al.
6,702,477 B1 3/2004 Ngo
6,848,833 B1 2/2005 Kamarauskas et al.
6,866,541 B2 3/2005 Barker et al.
6,872,090 B2 3/2005 De Dios Martin
7,029,182 B2 4/2006 Ngo
7,033,219 B2 4/2006 Gordon et al.
7,087,840 B2 8/2006 Herring et al.
7,112,090 B2 9/2006 Caveney et al.
7,156,696 B1 1/2007 Montena
7,207,846 B2 4/2007 Caveney et al.
7,220,145 B2 5/2007 Denovich et al.
7,273,383 B1 9/2007 Bennett
7,329,139 B2 2/2008 Benham
7,340,146 B2 3/2008 Lampert et al.
7,384,298 B2 6/2008 Caveney et al.
7,416,448 B2 8/2008 Gaidosch
7,476,120 B2 1/2009 Patel et al.
7,510,421 B2 3/2009 Fransen et al.
7,621,772 B1 * 11/2009 Tobey .................... H01R 13/58 439/460
7,628,644 B1 12/2009 Peluffo
7,628,657 B2 12/2009 Martich
7,637,769 B2 12/2009 Carreras Garcia et al.
7,645,160 B2 1/2010 Tabet
7,676,133 B2 3/2010 Lampert et al.
7,727,013 B1 6/2010 Paynter
7,766,688 B2 * 8/2010 Mateo Ferrus ...... H01R 13/501 439/417
7,806,721 B2 10/2010 Herndon et al.
7,819,698 B2 10/2010 Islam
7,854,624 B1 12/2010 Pepe
7,857,663 B2 12/2010 Chantrell et al.
7,871,285 B1 1/2011 Tobey et al.
7,874,865 B2 * 1/2011 Tobey ................ H01R 13/5837 439/460
7,909,622 B2 3/2011 Pepe et al.
7,938,680 B1 5/2011 Hsieh
7,955,120 B2 6/2011 Patel et al.
8,057,249 B1 11/2011 Tobey et al.
8,070,506 B2 12/2011 De Dios Martin et al.
8,075,344 B2 12/2011 Shih
8,109,784 B2 2/2012 Patel et al.
8,241,055 B2 8/2012 Chen
8,376,786 B2 2/2013 Carreras Garcia et al.
8,454,383 B2 6/2013 Paynter et al.
8,747,126 B2 6/2014 Corbett et al.
8,758,065 B2 6/2014 Fransen
8,791,374 B1 7/2014 Smith
8,834,196 B2 9/2014 Duran
8,911,256 B2 * 12/2014 Qiao .................. H01R 13/6581 439/607.18
9,022,792 B2 5/2015 Sticker et al.
9,583,885 B2 2/2017 Ruesca Fernandez
9,608,369 B1 * 3/2017 Brandt ............... H01R 13/6276
9,627,827 B2 4/2017 Bragg
9,640,898 B1 5/2017 Wubbels
9,761,998 B2 * 9/2017 De Dios Martin .......................... H01R 13/6335
9,768,556 B2 9/2017 Bopp
9,847,607 B2 * 12/2017 Bopp ................... H01R 4/2429
9,893,473 B2 * 2/2018 Kong ................... H01R 13/658
10,476,212 B2 11/2019 Bopp et al.
10,522,939 B2 12/2019 De Dios Martin
10,594,088 B2 3/2020 Cupples et al.
10,651,608 B2 5/2020 White
10,777,953 B2 * 9/2020 White .............. H01R 13/65917
10,784,640 B2 9/2020 Font Aranega et al.
10,958,012 B2 3/2021 De Dios Martin
11,342,718 B2 * 5/2022 De Dios Martín .. H01R 13/745
11,367,985 B2 * 6/2022 White ................ H01R 13/6592
2002/0058432 A1 5/2002 Chen et al.
2002/0119681 A1 8/2002 Follingstad et al.
2003/0081907 A1 5/2003 Malagrino, Jr. et al.
2004/0038582 A1 * 2/2004 Clement ............ H01R 13/6461 439/467
2004/0229501 A1 11/2004 Caveney et al.
2005/0103672 A1 5/2005 Peng
2005/0159036 A1 7/2005 Caveney et al.
2005/0201071 A1 9/2005 AbuGhazaleh et al.

(56) References Cited

U.S. PATENT DOCUMENTS

| | | | |
|---|---|---|---|
| 2006/0110986 | A1 | 5/2006 | King, Jr. et al. |
| 2006/0204200 | A1 | 9/2006 | Lampert et al. |
| 2007/0054521 | A1 | 3/2007 | John |
| 2007/0240902 | A1 | 10/2007 | Tapper |
| 2008/0090461 | A1 | 4/2008 | Pepe et al. |
| 2008/0096438 | A1 | 4/2008 | Clark et al. |
| 2008/0102686 | A1 | 5/2008 | Carreras Garcia et al. |
| 2008/0268719 | A1 | 10/2008 | Siemon et al. |
| 2008/0311800 | A1* | 12/2008 | Tsai Wu ............... H01R 13/745 439/709 |
| 2009/0004913 | A1 | 1/2009 | Caveney et al. |
| 2009/0034226 | A1 | 2/2009 | Herndon et al. |
| 2009/0243757 | A1 | 10/2009 | Xu et al. |
| 2009/0258545 | A1 | 10/2009 | Pepe et al. |
| 2009/0274422 | A1 | 11/2009 | Henry et al. |
| 2009/0311904 | A1 | 12/2009 | Chou-Hsing |
| 2009/0318033 | A1 | 12/2009 | Tobey |
| 2010/0151707 | A1 | 6/2010 | AbuGhazaleh et al. |
| 2010/0216335 | A1 | 8/2010 | Cobb |
| 2010/0255716 | A1 | 10/2010 | Frey et al. |
| 2011/0030343 | A1 | 2/2011 | Kiser et al. |
| 2011/0038581 | A1 | 2/2011 | Mudd et al. |
| 2011/0097924 | A1 | 4/2011 | Chen |
| 2011/0115494 | A1 | 5/2011 | Taylor et al. |
| 2011/0304343 | A1 | 12/2011 | Font Aranega |
| 2012/0196472 | A1 | 8/2012 | Fitzpatrick |
| 2012/0226807 | A1 | 9/2012 | Panella et al. |
| 2012/0244736 | A1* | 9/2012 | Duran ................ H01R 13/6592 439/345 |
| 2012/0244752 | A1 | 9/2012 | Patel et al. |
| 2012/0322307 | A1 | 12/2012 | Kudo |
| 2013/0203291 | A1 | 8/2013 | Sticker et al. |
| 2013/0210264 | A1 | 8/2013 | Rynaski et al. |
| 2013/0217249 | A1 | 8/2013 | Patel et al. |
| 2013/0260582 | A1 | 10/2013 | White |
| 2014/0080354 | A1 | 3/2014 | Caveney et al. |
| 2014/0242855 | A1* | 8/2014 | Kan ................... H01R 13/5213 439/892 |
| 2014/0287609 | A1 | 9/2014 | Fransen |
| 2014/0335726 | A1 | 11/2014 | Zhang |
| 2015/0349468 | A1 | 12/2015 | Singer et al. |
| 2016/0080836 | A1 | 3/2016 | Carreras Garcia |
| 2016/0248197 | A1 | 8/2016 | Fransen et al. |
| 2016/0285205 | A1 | 9/2016 | Rueseca Fernandez |
| 2017/0229825 | A1 | 8/2017 | Baines et al. |
| 2017/0302040 | A1 | 10/2017 | Taylor et al. |
| 2018/0287312 | A1 | 10/2018 | De Dios Martin et al. |
| 2018/0358739 | A1 | 12/2018 | De Dios Martin |
| 2020/0137465 | A1 | 4/2020 | White et al. |
| 2020/0244003 | A1 | 7/2020 | De Dios Martin |
| 2020/0267862 | A1 | 8/2020 | Taguchi et al. |
| 2020/0351573 | A1 | 11/2020 | Shih |
| 2021/0143600 | A1 | 5/2021 | Font Aranega et al. |
| 2021/0281009 | A1 | 9/2021 | De Dios Martin |

FOREIGN PATENT DOCUMENTS

| | | | |
|---|---|---|---|
| CN | 201303074 | Y | 9/2009 |
| CN | 201741918 | U | 2/2011 |
| CN | 201774068 | U | 3/2011 |
| CN | 202025948 | U | 11/2011 |
| CN | 102957034 | A | 3/2013 |
| CN | 203218574 | U | 9/2013 |
| CN | 103384042 | A | 11/2013 |
| DE | 101 13 230 | A1 | 9/2002 |
| EP | 0 073 112 | A1 | 3/1983 |
| EP | 0 775 845 | A2 | 5/1997 |
| EP | 1 189 085 | A2 | 3/2002 |
| EP | 1 422 793 | A1 | 5/2004 |
| EP | 1 443 608 | A2 | 8/2004 |
| EP | 1 484 824 | A2 | 12/2004 |
| EP | 2 133 957 | A1 | 12/2009 |
| ES | 2 178 813 | T3 | 1/2003 |
| ES | 2 257 514 | T3 | 8/2006 |
| ES | 1 138 538 | U | 4/2015 |
| ES | 2 583 636 | A1 | 9/2016 |
| ES | 2 584 539 | A1 | 9/2016 |
| ES | 2 600 968 | A1 | 2/2017 |
| FR | 2 701 007 | A1 | 8/1994 |
| FR | 2 893 454 | A1 | 5/2007 |
| GB | 221 872 | A | 9/1924 |
| GB | 2 260 660 | A | 4/1993 |
| GB | 2 308 508 | A | 6/1997 |
| GB | 2 457 982 | A | 9/2009 |
| GB | 2 469 123 | A | 10/2010 |
| JP | 2001-244029 | A | 9/2001 |
| JP | 2006-126807 | A | 5/2006 |
| JP | 2007-299620 | A | 11/2007 |
| JP | 2007-313060 | A | 12/2007 |
| JP | 2013-235783 | A | 11/2013 |
| KR | 2001-0100594 | A | 11/2001 |
| KR | 20-2010-0008888 | U | 9/2010 |
| TW | M349117 | U | 1/2009 |
| WO | 95/34923 | A1 | 12/1995 |
| WO | 97/44862 | A1 | 11/1997 |
| WO | 99/19944 | A1 | 4/1999 |
| WO | 03/026076 | A1 | 3/2003 |
| WO | 2005/104300 | A1 | 11/2005 |
| WO | 2008/059203 | A2 | 5/2008 |
| WO | 2008/095830 | A1 | 8/2008 |
| WO | 2011/038387 | A1 | 3/2011 |
| WO | 2013/090201 | A1 | 6/2013 |
| WO | 2013/096279 | A1 | 6/2013 |
| WO | 2013/123154 | A1 | 8/2013 |
| WO | 2014/167449 | A1 | 10/2014 |
| WO | 2016/151172 | A1 | 9/2016 |
| WO | 2016/151177 | A1 | 9/2016 |
| WO | 2016/156643 | A1 | 10/2016 |
| WO | 2016/156644 | A1 | 10/2016 |
| WO | 2018/009698 | A1 | 1/2018 |
| WO | 2018/034870 | A1 | 2/2018 |
| WO | 2018/236875 | A1 | 12/2018 |
| WO | 2019/094558 | A1 | 5/2019 |

OTHER PUBLICATIONS

Extended European Search Report for Application No. 18820793.0 mailed Feb. 12, 2021.

Extended European Search Report for Application No. 18875839.5 mailed Jul. 19, 2021.

Extended European Search Report for Application No. 2017844.9 mailed Aug. 24, 2020.

First Office Action for Chinese Patent Application No. 201880072621.7 mailed Aug. 17, 2021, 21 pages.

International Search Report and Written Opinion for Application No. PCT/ES2016/070204 mailed Jun. 6, 2016.

International Search Report and Written Opinion for Application No. PCT/ES2016/070212 mailed Jun. 2, 2016.

International Search Report and Written Opinion for Application No. PCT/ES2016/070213 mailed Jun. 7, 2016.

International Search Report and Written Opinion for Application No. PCT/ES2016/070190 mailed Jul. 5, 2016.

International Search Report and Written Opinion for Application No. PCT/EP2016/069310 mailed Oct. 14, 2016.

International Search Report and Written Opinion for Application No. PCT/US2017/040947 mailed Oct. 13, 2017.

International Search Report and Written Opinion for Application No. PCT/US2018/038295 mailed Oct. 16, 2018.

International Search Report and Written Opinion for Application No. PCT/US2018/059775 mailed Mar. 4, 2019.

International Search Report and Written Opinion of the International Searching Authority for International Patent Application No. PCT/US2017/045539 mailed Nov. 15, 2017, 15 pages.

International Search Report and Written Opinion of the International Searching Authority for International Patent Application No. PCT/US2018/059780 mailed Mar. 4, 2019, 12 pages.

"Mini-Com All Metal Shielded Modular Patch Panels, Installation Instructions", Panduit, 2 pages (2010).

(56) References Cited

OTHER PUBLICATIONS

"Mini-Com® All Metal Shielded Modular Patch Panels, Installation Instructions, Specification Sheet", Panduit, 3 pages (2016).
Product Specifications: 1-1479191-3, SL Series Speaker Post Insert, red stripe, alpine white, CommScope, Inc., 1 page (Sep. 6, 2017).
State of the Art Report for Application No. 201530372 mailed Mar. 20, 2015.
State of the Art Report for Application No. 201530377 mailed Mar. 23, 2015.
State of the Art Report for Application No. 201530417 mailed Mar. 27, 2015.
State of the Art Report for Application No. 201530418 mailed Mar. 27, 2015.
State of the Art Report for Application No. 201530419 mailed Mar. 27, 2015.
State of the Art Report for Application No. 201531199 mailed Aug. 13, 2015.

* cited by examiner

CONNECTOR ASSEMBLY WITH GROUNDING

CROSS-REFERENCE TO RELATED APPLICATIONS

This application is a Continuation of U.S. patent application Ser. No. 17/018,690, filed on Sep. 11, 2020, now U.S. Pat. No. 11,367,985, which is a Continuation of U.S. patent application Ser. No. 16/326,055, filed on Feb. 15, 2019, now U.S. Pat. No. 10,777,953, which is a National Stage Application of PCT/US2017/045539, filed on Aug. 4, 2017, which claims the benefit of U.S. Patent Application Ser. No. 62/375,269, filed on Aug. 15, 2016, and claims the benefit of U.S. Patent Application Ser. No. 62/375,260, filed on Aug. 15, 2016, and claims the benefit of U.S. Patent Application Ser. No. 62/521,952, filed on Jun. 19, 2017, the disclosures of which are incorporated herein by reference in their entireties. To the extent appropriate, a claim of priority is made to each of the above disclosed applications.

BACKGROUND

Electrical connectors are useful for providing a connection point for telecommunications systems. For example, RJ-type connectors can be provided as wall sockets wherein electronic data cables are terminated and mating electrical plugs can be inserted into the sockets. Frequently, this termination process occurs in the field and at the actual location where the cables to be attached to the connectors are being installed. In such instances, it is often necessary to provide a grounding connection between the cable and its attached connector.

SUMMARY

A connector assembly is disclosed. Connector assemblies including a grounding component are disclosed. The disclosed connector assemblies provide for a compact cable clamp/shield connection method that can accommodate a large range of cable sizes. For example, the disclosed clamp can accommodate cables ranging from 4.6 to 9.0 mm. Another feature of the disclosed assemblies is that all parts of the grounding features are inboard of the sides of the connector assembly or jack such that no protrusions exist. As the connector assemblies or jacks are to be used in high density applications, where in some cases they are mounted side by side and or back to back, any protrusions from a clamp outside the connector assembly bodies would prevent this configuration.

In one example, a connector assembly is disclosed including a connector part defining a front housing having a jack cavity and a cable manager part having a rear housing and a grounding part. The rear housing defines a central aperture through which a cable having an exposed conductive element can extend. The grounding part secures the rear housing to the front housing and provides grounding contact between the cable conductive element and the connector part. In one example, the cable manager part includes a lacing fixture part securing individual wires of the cable terminated to the connector part that is secured between the grounding part and the front housing.

A method for assembling a connector assembly is also disclosed that includes the steps of: providing a connector part defining a front housing having a jack cavity; providing a cable manager part including a rear housing and a grounding part, the grounding part being for providing a grounding connection between a sheath of an inserted cable and the connector part; securing the grounding part to the rear housing; and securing the grounding part to the front housing such that the front housing is secured to the rear housing.

In one example, a connector assembly is disclosed including a connector part defining a front housing having a jack cavity and a cable manager part having a rear housing and a grounding arrangement. The rear housing defines a central aperture through which a cable having an exposed conductive element can extend. The grounding arrangement is secured to the end wall of the rear housing and includes a plurality of deflectable flange members extending across the central aperture. The flange members are arranged to provide a spring force against the cable and grounding contact between the cable conductive element and the connector part.

A method for assembling a connector assembly is also disclosed that includes the steps of: providing a connector part defining a front housing having a jack cavity; providing a cable manager part including a rear housing and a grounding arrangement including a plurality of separate grounding members, the grounding arrangement being for providing a grounding connection between a sheath of an inserted cable and the connector part; securing each of the grounding members to an end wall the rear housing; and securing the front housing to the rear housing.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 55 is a perspective view of a cable manager part usable with the connector part shown in FIG. 53, with a cable inserted partially there through.

DETAILED DESCRIPTION

Figure 1:
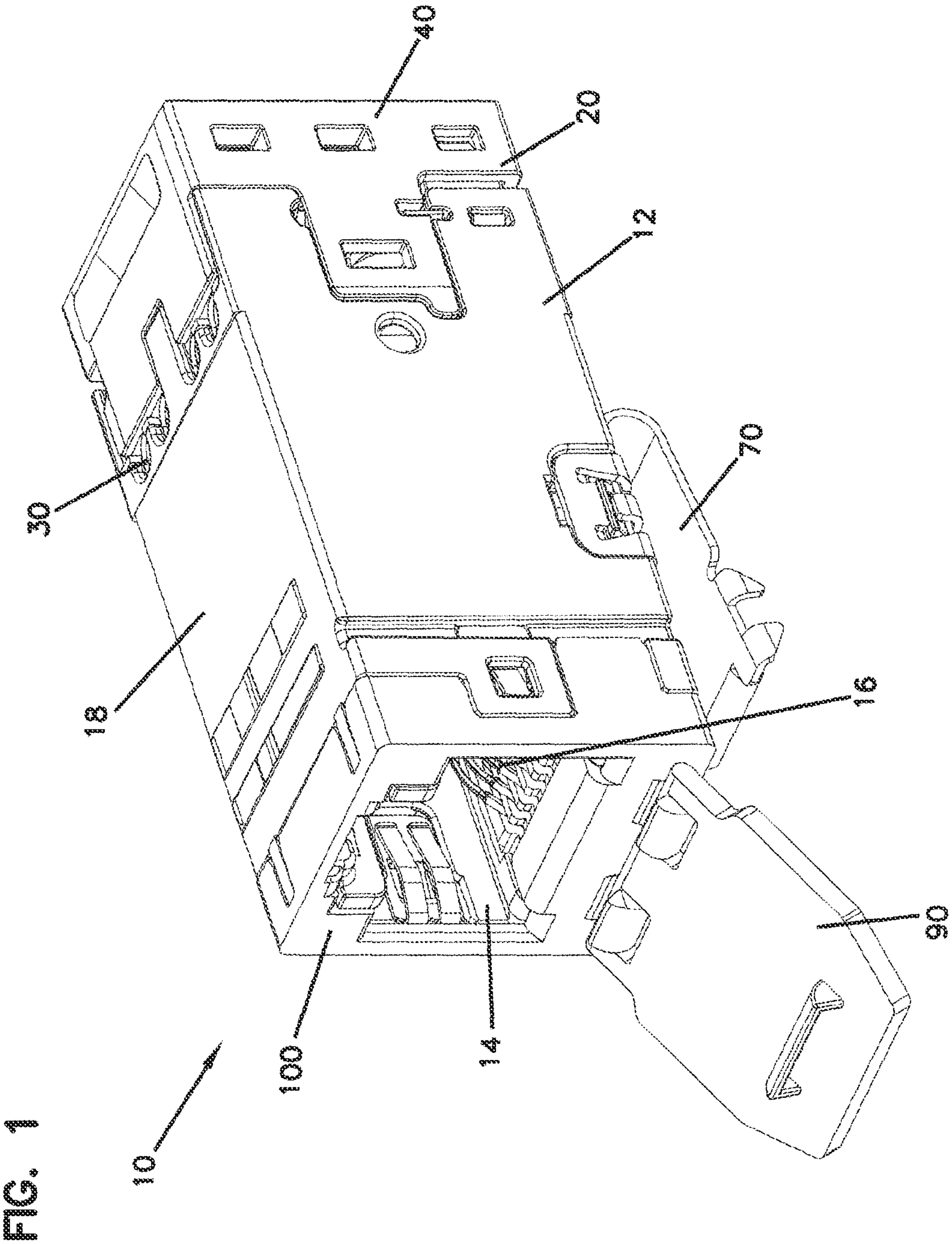
FIG. 1 is a perspective view of a telecommunications connector having a connector part and a cable manager part that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 29:
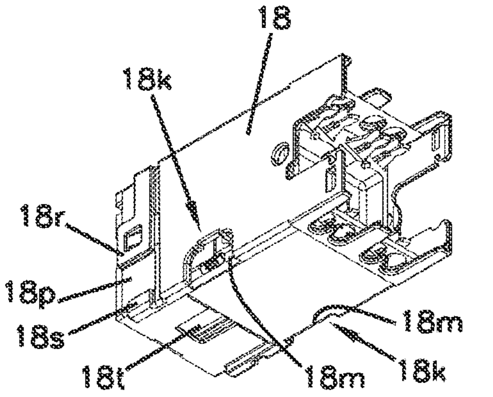
FIG. 29 is a rear-bottom perspective view of the front housing part shown in FIG. 28.
Figure 30:
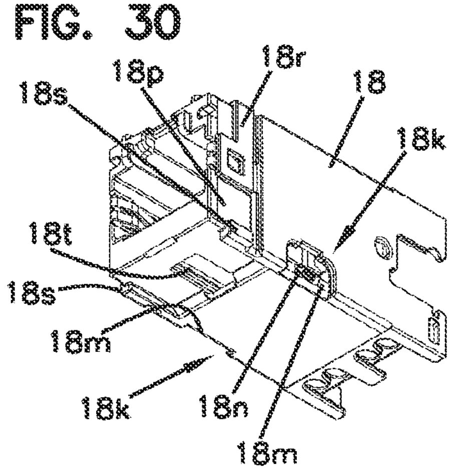
FIG. 30 is a front-bottom perspective view of the front housing part shown in FIG. 28.
Figure 31:
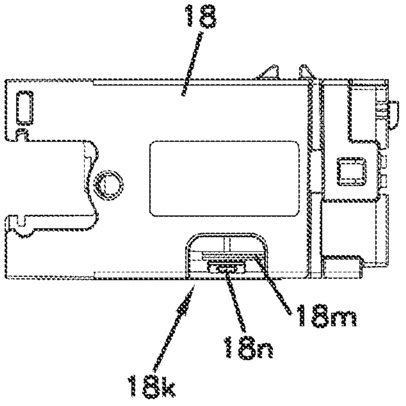
FIG. 31 is a side view of the front housing part shown in FIG. 28.
Figure 32:
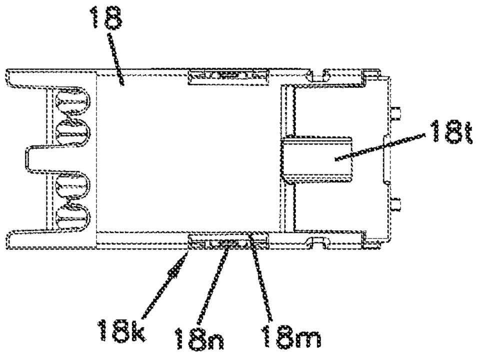
FIG. 32 is a bottom view of the front housing part shown in FIG. 28.
Figure 33:
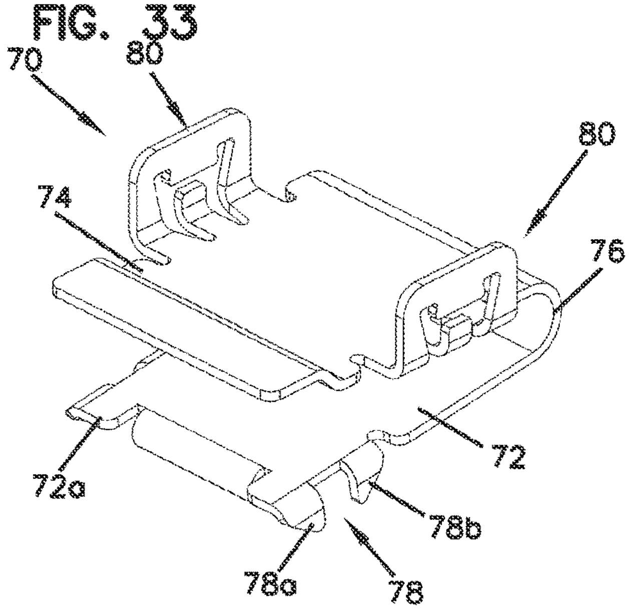
FIG. 33 is a top perspective view of the latch member shown in FIG. 28.
Figure 34:
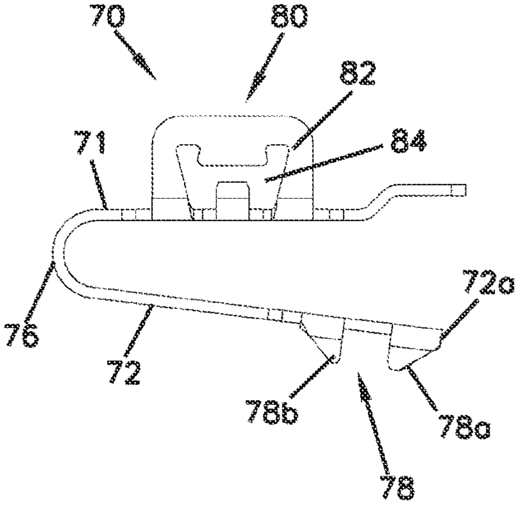
FIG. 34 is a side view of the latch member shown in FIG. 28.
Figure 35:
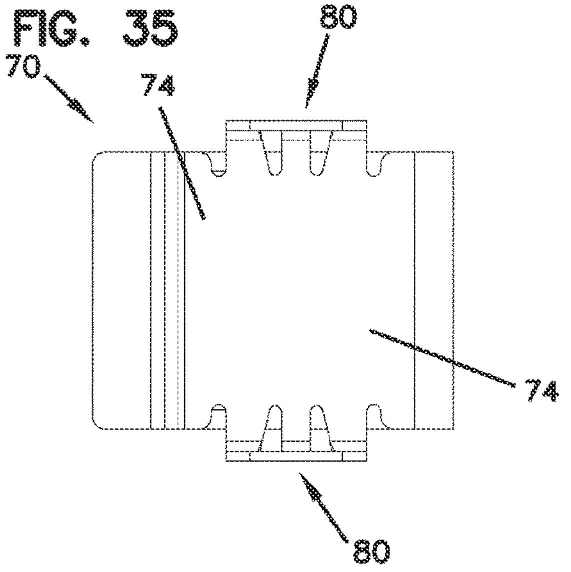
FIG. 35 is a top view of the latch member shown in FIG. 28.
Figure 36:
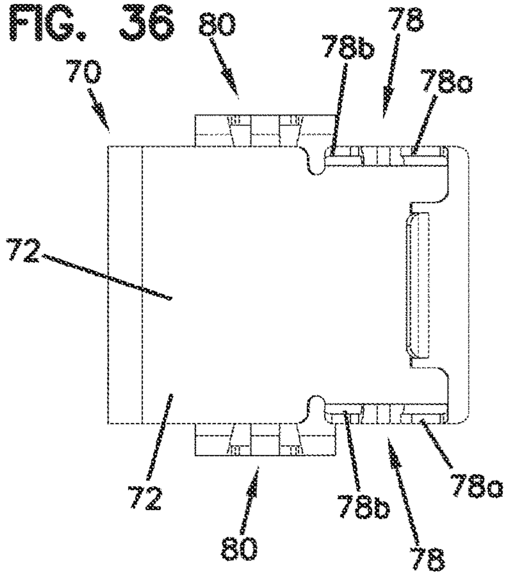
FIG. 36 is a bottom view of the latch member shown in FIG. 28.
Figure 37:
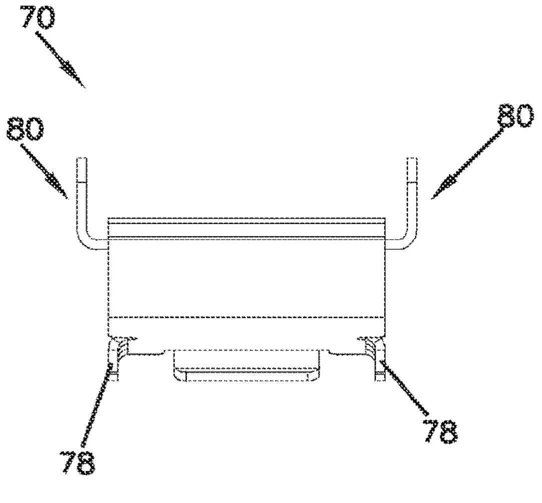
FIG. 37 is a front view of the latch member shown in FIG. 28.
Figure 38:
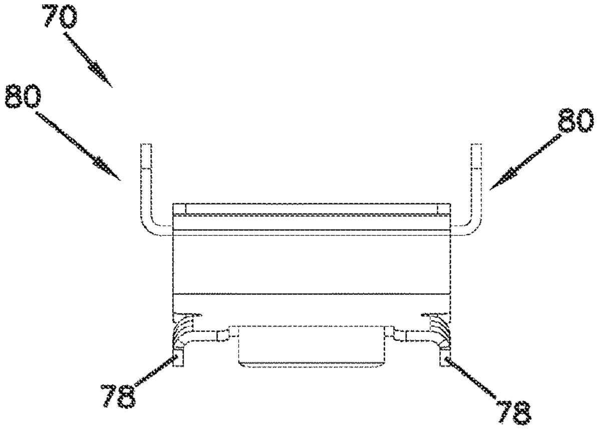
FIG. 38 is a rear view of the latch member shown in FIG. 28.
Figure 39:
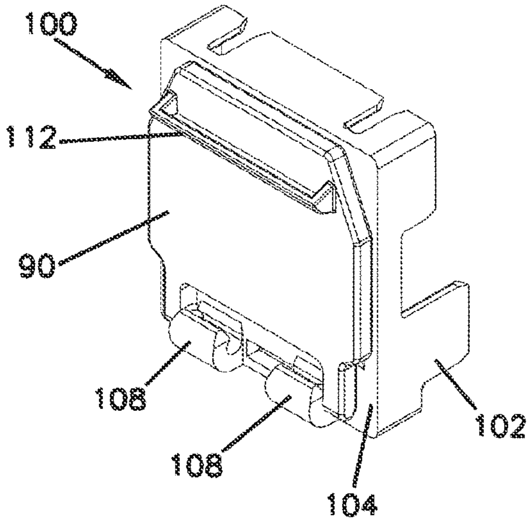
FIG. 39 is a front perspective view of the cover assembly shown in FIG. 28.
Figure 40:
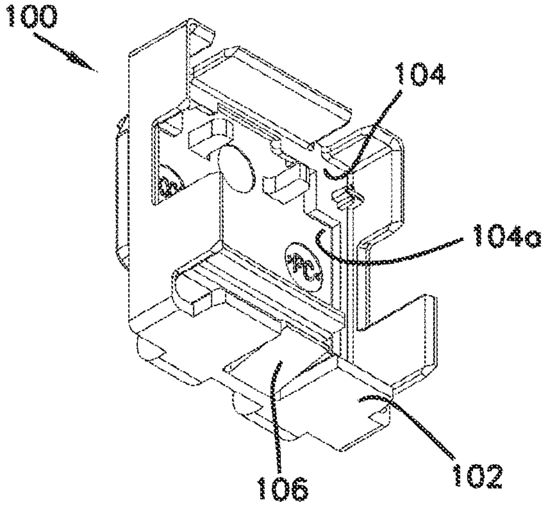
FIG. 40 is a bottom perspective view of the cover assembly shown in FIG. 39.
Figure 41:
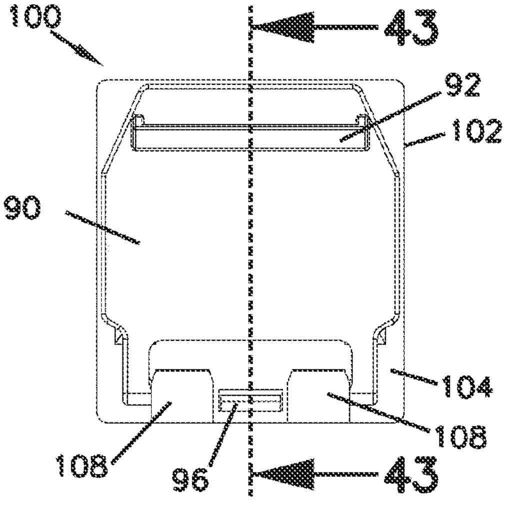
FIG. 41 is a front view of the cover assembly shown in FIG. 39.
Figure 42:
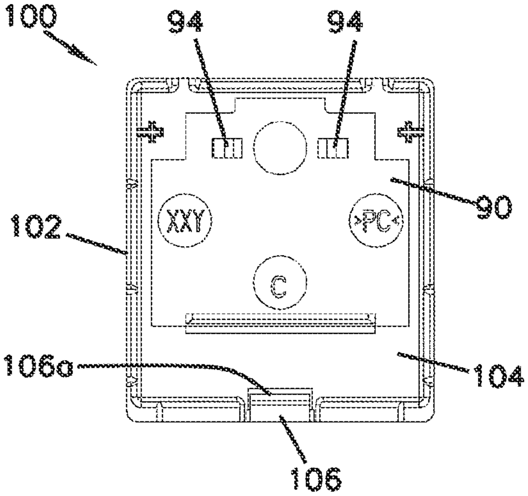
FIG. 42 is a rear view of the cover assembly shown in FIG. 39.
Figure 43:
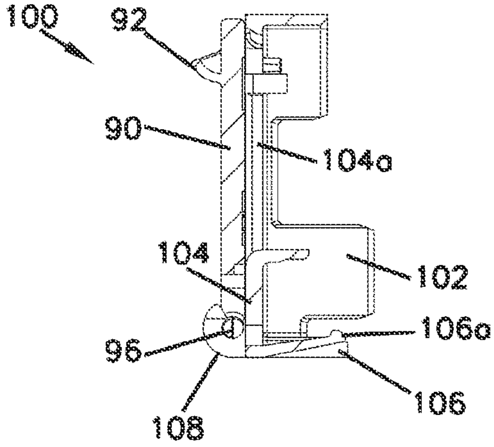
FIG. 43 is a cross-sectional view of the cover assembly shown in FIG. 39, taken along the line 43-43 in FIG. 41.
Figure 44:
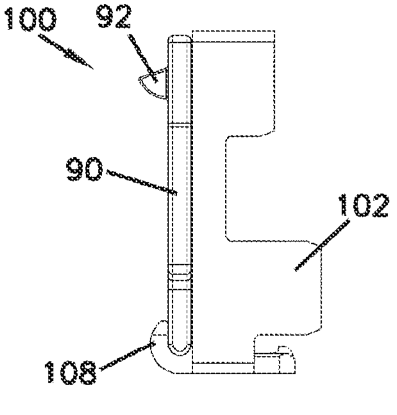
FIG. 44 is a side view of the cover assembly shown in FIG. 39.
Figure 45:
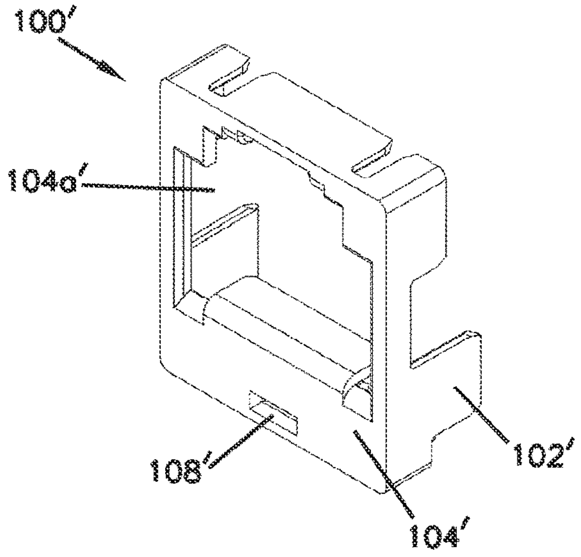
FIG. 45 is a front perspective view of a second example of a cover assembly suitable for use with the front housing part shown in FIG. 28.
Figure 46:
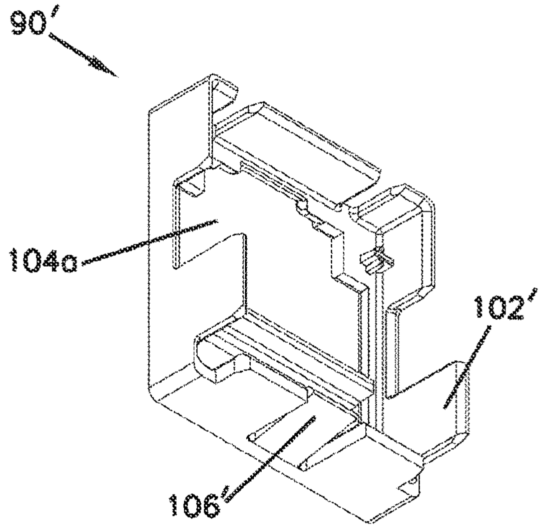
FIG. 46 is a bottom perspective view of the cover assembly shown in FIG. 45.
Figure 47:
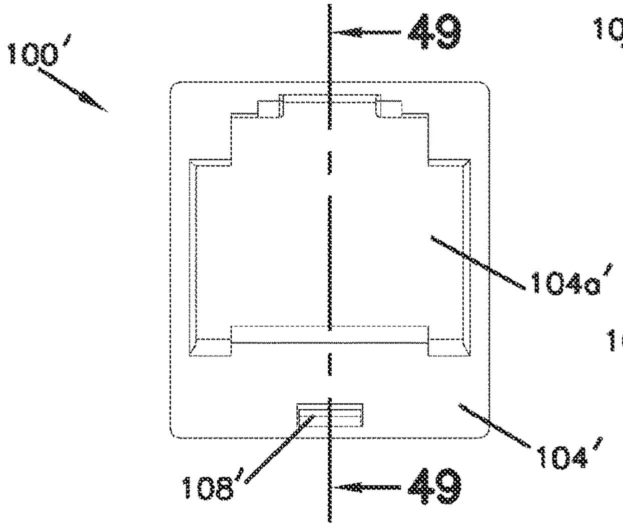
FIG. 47 is a front view of the cover assembly shown in FIG. 45.
Figure 48:
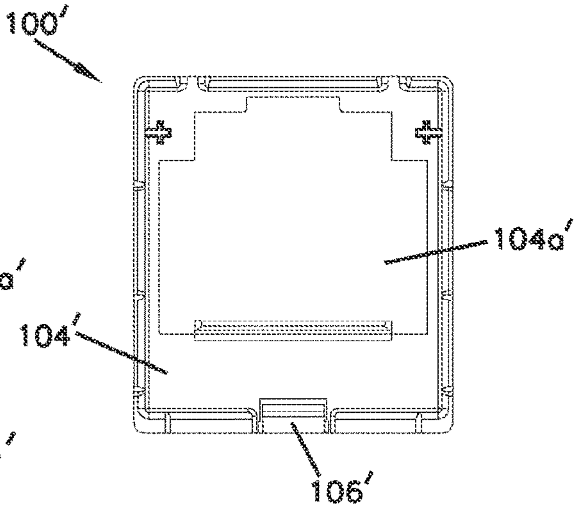
FIG. 48 is a rear view of the cover assembly shown in FIG. 45.
Figure 49:
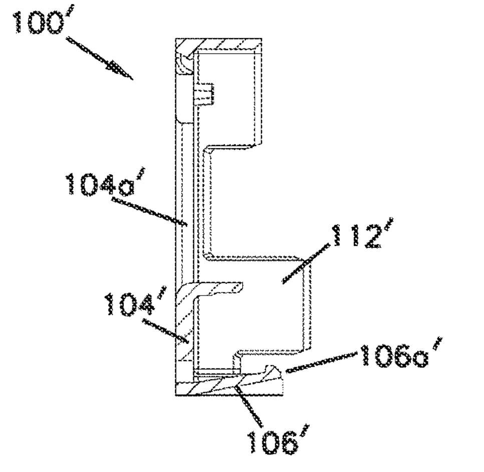
FIG. 49 is a cross-sectional view of the cover assembly shown in FIG. 45, taken along the line 49-49 in FIG. 47.
Figure 50:
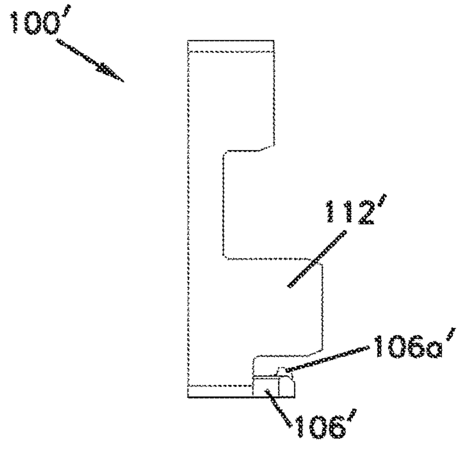
FIG. 50 is a side view of the cover assembly shown in FIG. 45.
Figure 51:
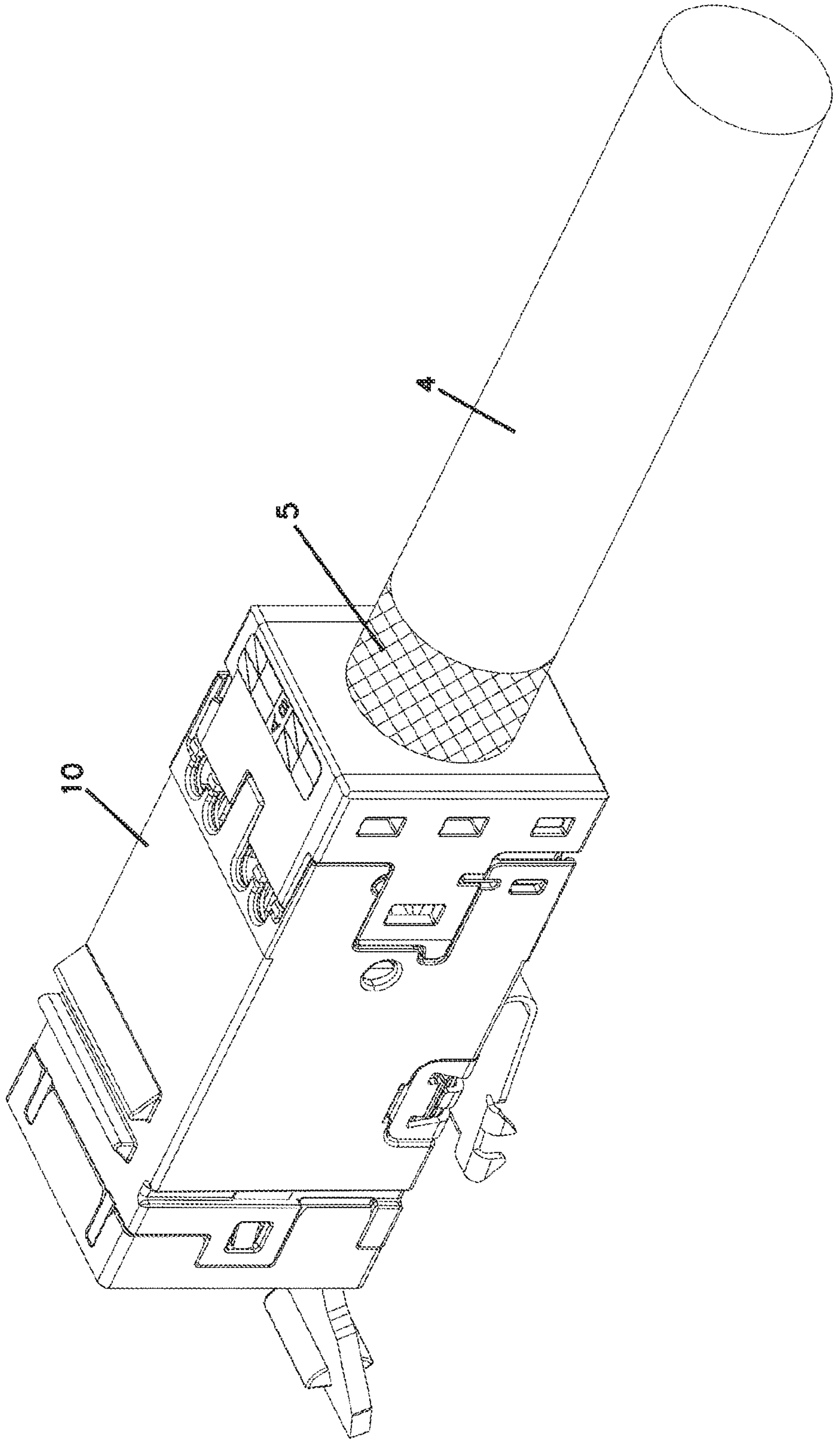
FIG. 51 is a schematic perspective view of a cable inserted into the cable manager part shown in FIG. 1.
Figure 52:
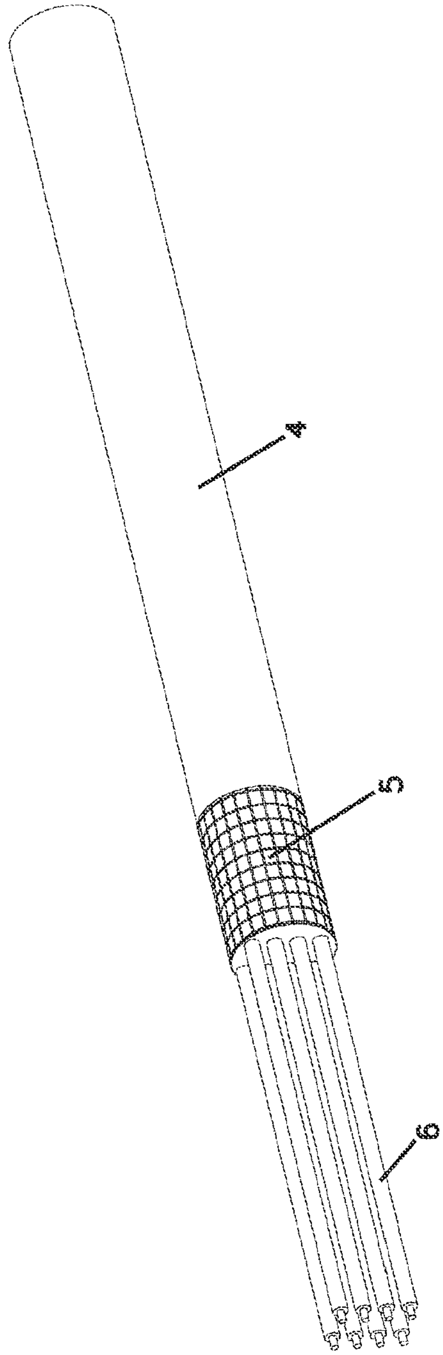
FIG. 52 is a schematic perspective view of the cable shown in FIG. 5.
Figure 53:
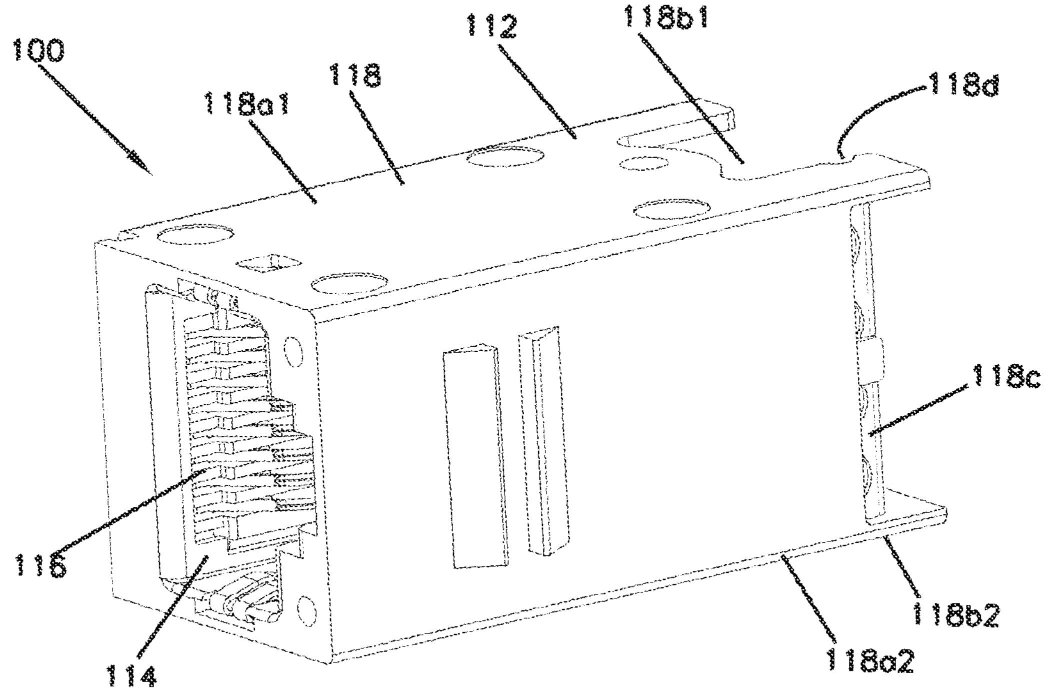
FIG. 53 is a first perspective view of a connector part usable in an assembly of the type shown in FIG. 1.
Figure 54:
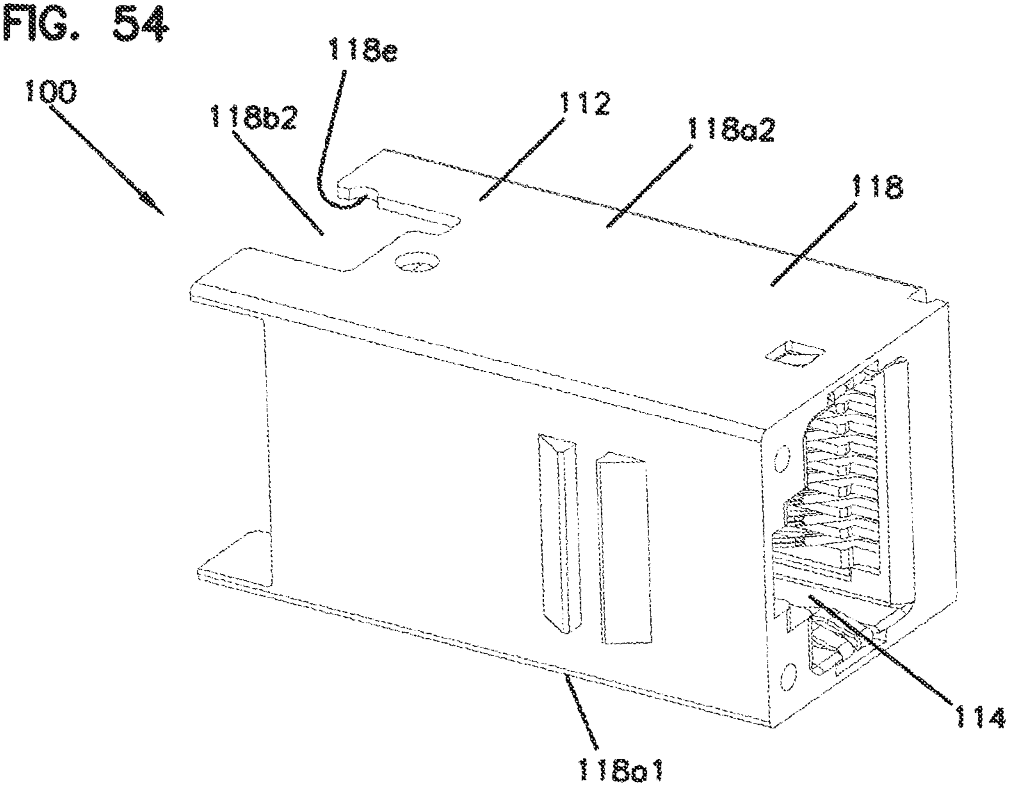
FIG. 54 is a second perspective view of the connector part shown in FIG. 53.

A telecommunications connector 10 for grounded connection with a cable 4 having a conductive element 5 and a plurality of wires 6 is shown. One example of a suitable cable 4 is shown at FIG. 29. As used herein, term "conductive element" is defined as including any type of conductive element, shield, or sheath disposed over the cable jacket, including metal braids, meshes, foils, drain wires, and combinations thereof. In one example, the cable 4 includes a plurality of insulated copper wires 6, for example, four sets of twisted wire pairs, while the connectors 10 are modular or RJ-type connectors.

As shown, the telecommunications connector 10 has a connector part 12 that mates to a cable manager part 20, each of which includes further subassemblies. As shown, the connector part 12 includes a jack cavity 14 for receiving a corresponding plug (not shown). A cover assembly 100 having a rotatable dust cover 90 is shown as providing selective access to the jack cavity 14, as discussed in more detail later. The connector part 12 can include a plurality of electrical contact members or conductors 16 for which electrical connection to the wires 6 will be made through a termination and connection process. As shown, the connector part 12 is configured with a front housing 18 having conductive sidewalls 18*a* (18*a*1, 18*a*2) which are formed from a conductive material, such as a metal material. In one aspect, one or more of the sidewalls 18*a* can define a respective recess portion 18*b*. As shown, two recess portions 18*b* (18*b*1, 18*b*2) are provided. The recess portions 18*b* receive and connect to portions of the connector part 20, such that conductive contact is established between the cable manager part 20 and the sidewalls 18*a* of the connector part front housing 18. Accordingly, the connector 10 is grounded to the cable conductive element 5 via the cable manager part 20 and the sidewalls 18*a* of the connector part 12.

In one aspect, the connector part front housing 18 is provided cutting edges 18*c* which are designed to cut the wires 6 of the cable 4 during the termination process. One example of a suitable termination process and connector part is shown and described in Spain patent application P201530417, entitled Connector Assembly with Grounding Spring and filed on 27 Mar. 2015, the entirety of which is incorporated by reference herein. Another example of a suitable termination process and connector part is shown and described in Spain patent application P201531199, entitled Connector Assembly with Grounding Spring Clamp and filed on 13 Aug. 2015, the entirety of which is incorporated by reference herein.

In one aspect, the cable manager part 20 can be further provided with a lacing fixture 30, a rear housing 40, and a grounding part 50. As configured, the grounding part 50 latches and secures the connector part front housing 18 to the rear housing part 40 such that the lacing fixture is clamped therebetween.

The grounding part 50 is shown in isolation at FIGS. 24-27. As presented, the grounding part 50 is provided with and end wall 50*a* which defines an aperture 50*b*. A plurality of flange members 50*c* extends from the end wall 50*a* towards the center of the aperture. As shown, each of the flange members 50*c* includes a main portion 50*d* extending from a base end 50*e* proximate the end wall 50*a* to a tip portion 50*f*. Each of the flange member main portions 50*d* extend at a first angle a1 away from the end wall 50*a* at the base portion 50*e* while the tip portion 50*f* extends at a second angle a2 relative to the base portion 50*e*. As shown, the first angle a1 is about 44 degrees while the second angle a2 is about 60 degrees. Other angles are possible. The main portions 50*d* are disposed at the first angle a1 to facilitate insertion of the cable 4 while providing the optimal spring force against the cable sheath 5. The tip portions 50*f* are bent to the second angle a2 so that the flange members 50*c* do not present a sharp edge against the cable sheath 5 as it is passing by the flange members 50*c*, which also facilitates removal of the cable after insertion. In one embodiment, the grounding part 50 is formed from a metal material, such as stainless steel or a copper alloy.

The grounding part 50 can also be provided with sidewalls 52*a*, 52*b*, 52*c*, 52*d*, and with arm extensions 52*e*, 52*f*, each of which extends from the end wall 50*a*. As shown, the sidewalls 52*a*, 52*b*, 52*c*, 52*d* extend generally orthogonally from the end wall 50*a* while the arm extensions 52*e*, 52*f* extend at a slight oblique angle a3 to facilitate insertion of the grounding part 50 into the rear housing 40. The sidewalls 52*a*, 52*b* are respectively provided with bent portions or tabs 54*a*, 54*b* and 54*c*, 54*d* that serve as latches that engage with corresponding recess portions 44*a*, 44*b* and 44*c*, 44*d* of the rear housing 40. The extension arms 52*e*, 52*f* are provided with bent portions or tabs 54*e*, 54*f* that also engage with recess portions 44*e*, 44*f* of the rear housing 40. The extension arms 52*e*, 52*f* are further provided with bent portions or tabs 54*g*, 54*h* and with orthogonal flange portions 54*i*, 54*j*. The tabs 54*g*, 54*h* engage with recess portions 18*d*, 18*e* of the front housing 18. The flange portions 54*i*, 54*j* extend orthogonally into corresponding slots or recesses 44*h*, 44*g* in the rear housing part 40 and into slots or recesses 18*f*, 18*g* in the front housing 18 so that when an attempt is made to separate the front housing 18 from the rear housing 40, there is a shear effect acting on the flange 54*i*, 54*j*. Thus, the flanges 54*i*, 54*j* provides increased retention force, since any removal force would be applied against the flanges 54*i*, 54*j* in a shear force condition. The angled tabs or latches 54*g*, 54*h* act as a means of deflection so that the locking flanges 54*i*, 54*j* are deflected to allow for the wall of the rear housing part 40 to run past before locking into the slots 18*d*, 18*e*.

The rear housing 40 is shown in isolation at FIGS. 13-17. The rear housing includes an end wall 40*a* defining a central aperture 40*b*. The rear housing also includes sidewalls 42*a*, 42*b*, 42*c*, and 42*d* which extend from the end wall 40*a*. Together, the sidewalls 42*a*-42*d* and the end wall 40*a* form an interior cavity into which the grounding part 50 is received. The grounding part 50 is received by the rear housing 40 such that the end walls 40*a* and 50*a* are adjacent and such that the central apertures 40*b* and 50*b* are coaxially aligned. As stated previously, the grounding part 50 is secured to the housing part 40 via tabs 54*a*, 54*b*, 54*e* which respectively latch into recesses 44*a*, 44*b*, 44*e* in the sidewall 42*a* of the housing part 40 and via tabs 54*c*, 54*d*, 54*f* which respectively latch into recesses 44*c*, 44*d*, 44*f* in the sidewall 42*b* of the housing part 40.

Figure 2:
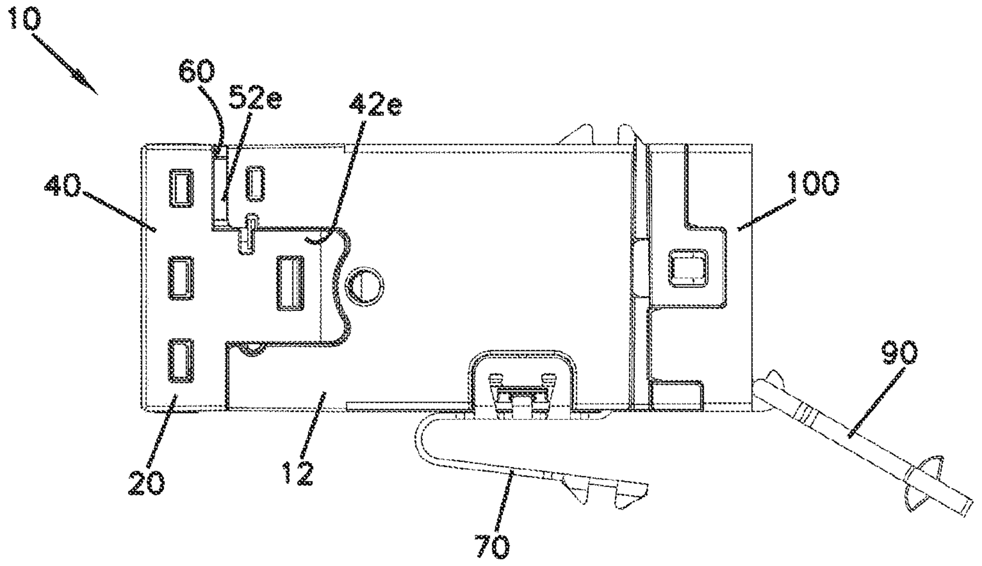
FIG. 2 is a first side view of the telecommunications connector shown in FIG. 1.
Figure 3:
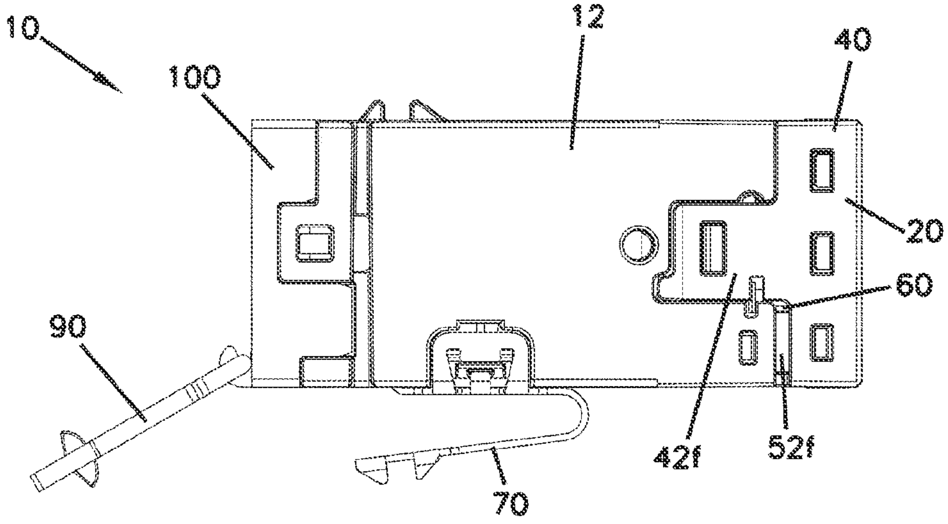
FIG. 3 is a second side view of the telecommunications connector shown in FIG. 1.

The rear housing 40 is also shown as including projecting sidewalls 42*e*, 42*f* which respectively extend from sidewalls 42*a*, 42*b*. In one aspect, the connector part 12 and the cable manager part sidewalls 42*e*, 42*f* may be configured in a complementary manner, so that the connector part 12 is able to engage with the cable manager part 20 only in one orientation. For example, the recess portion 18*b*1 on one side of the front housing 18 may be configured with a different size and/or shape than the recess portion 18*b*2 on the opposite side of the front housing 18. As can be seen at FIGS. 2 and 3, the rear housing 40 is provided with a pair of projecting sidewalls 42*e*, 42*f* that are respectively received into the recess portions 18*b*1, 18*b*2. Each of the projecting sidewalls 42*e*, 42*f* is provided with a different shape corresponding to the recess portion 18*b*1, 18*b*2 into which it is intended to be received within. Accordingly, the rear housing 40 can only be fully engaged and connected to the front housing 18 in only a single orientation.

Figure 4:
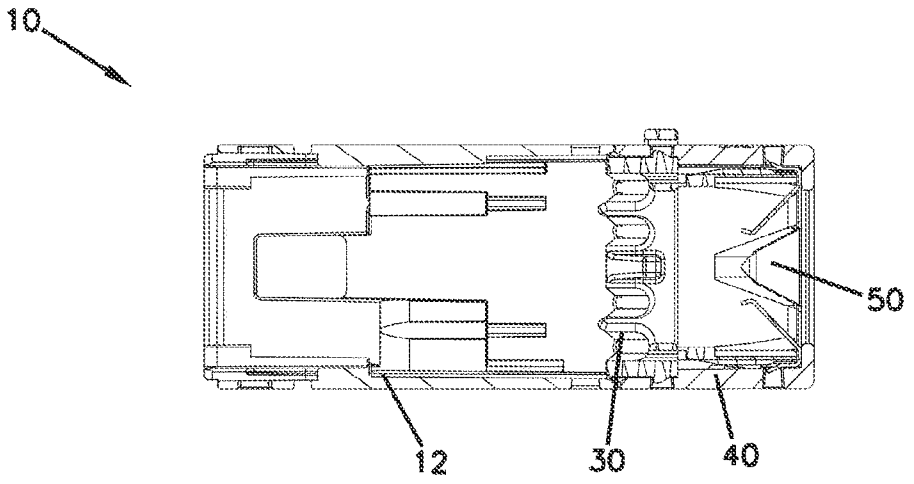
FIG. 4 is a cross-sectional side view of the telecommunications connector shown in FIG. 1.
Figure 5:
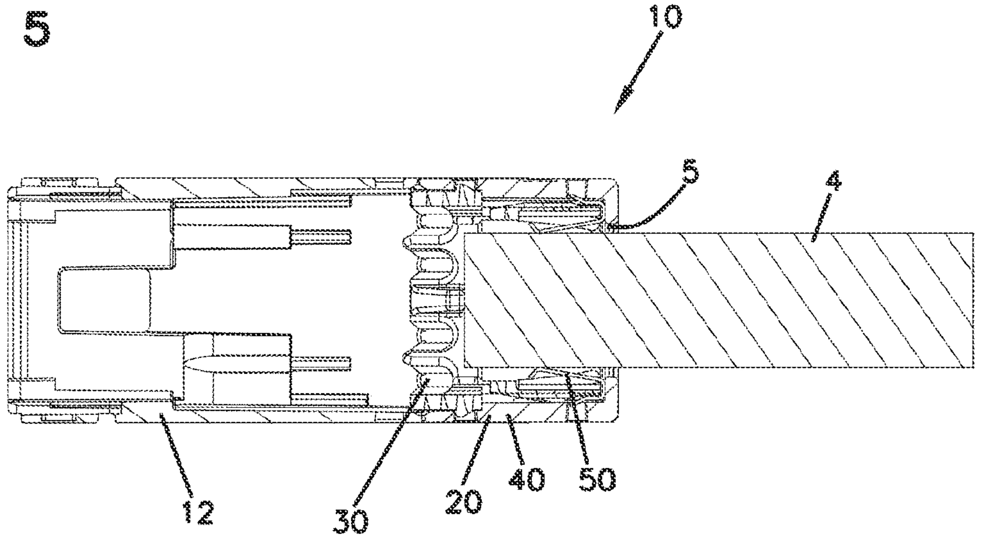
FIG. 5 is a cross-sectional side view of the telecommunications connector shown in FIG. 1, with a cable inserted into the connector.

Once the grounding part 50 is received and secured to the rear housing 40, the lacing fixture part 30 can be received by the rear housing 40. As shown, the lacing fixture part 30 includes a lacing fixture or structure 32, a pair of sidewalls 34*a*, 34*b*, and a perimeter wall structure 36. The lacing fixture 32 and perimeter wall structure 36 define a central aperture 30*a* that, once the lacing fixture part 30 is installed, is coaxially aligned with central apertures 40*b* and 50*b*. The sidewalls 34*a*, 34*b* and the perimeter wall structure 36 each extend from the lacing structure 32. The lacing structure 32 functions to place the wires 6 in the appropriate orientation for termination. An example lacing structure 32 suitable for use with the lacing fixture part 50 disclosed herein can be found in Spain patent application P201530372 entitled Connector with Separable Lacing Fixture and filed on 20 Mar. 2015, the entirety of which is incorporated by reference herein. As can be most easily seen at FIG. 4, the perimeter wall structure 36 receives the flange members 50*c*. The perimeter wall structure 36 supports the flange members 50*c* within recessed portions 36*a* when the flange members 50*c* are deflected sufficiently by an inserted cable 4. The ends of the sidewalls 34*a*, 34*b* and the perimeter wall structure 35 engage against the grounding part end wall 50*a* such that, when a cable 4 is inserted, the flange members 50*c* deflect relative to the end wall 50*a*. FIG. 5 shows a cable 4 inserted into the cable manager part 20 such that the flange members 50*c* are deflected towards and partially into the recessed portions 36*a* with the ends of the sidewalls 34*a*, 34*b* and perimeter wall structure 36 engaging against the grounding part end wall 50*a*.

Figure 6:
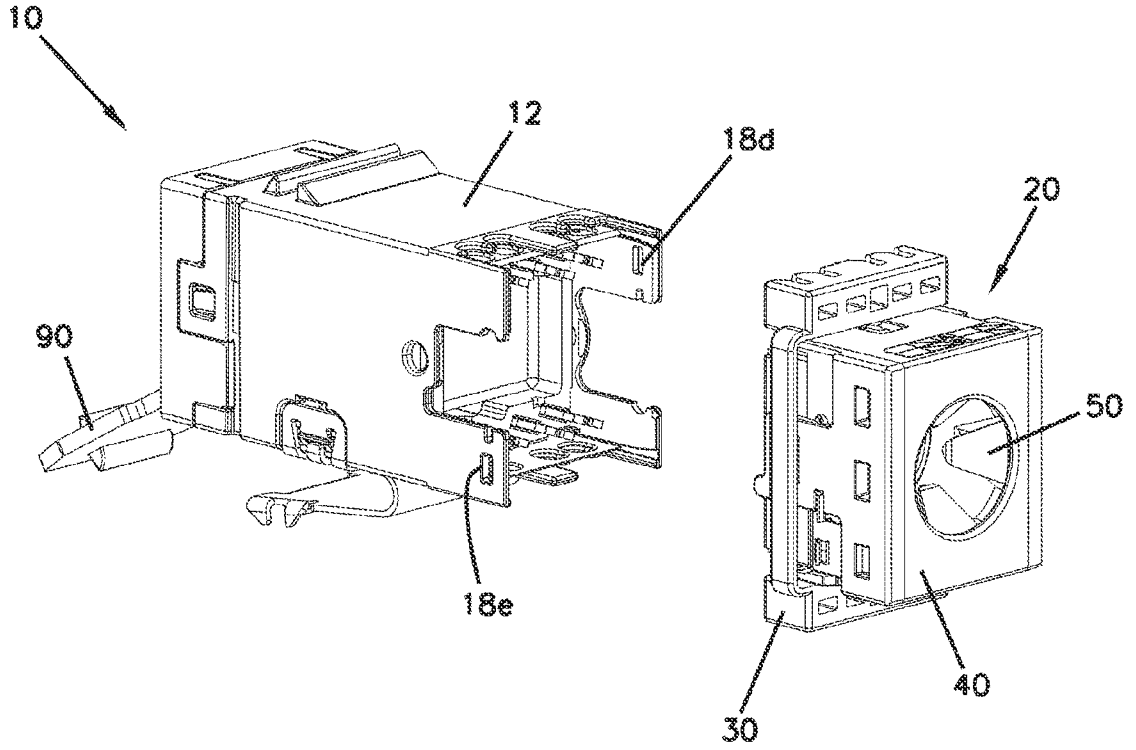
FIG. 6 is an exploded perspective view of the telecommunications connector shown in FIG. 1, with the cable manager part being shown as separated from the connector part.
Figure 7:
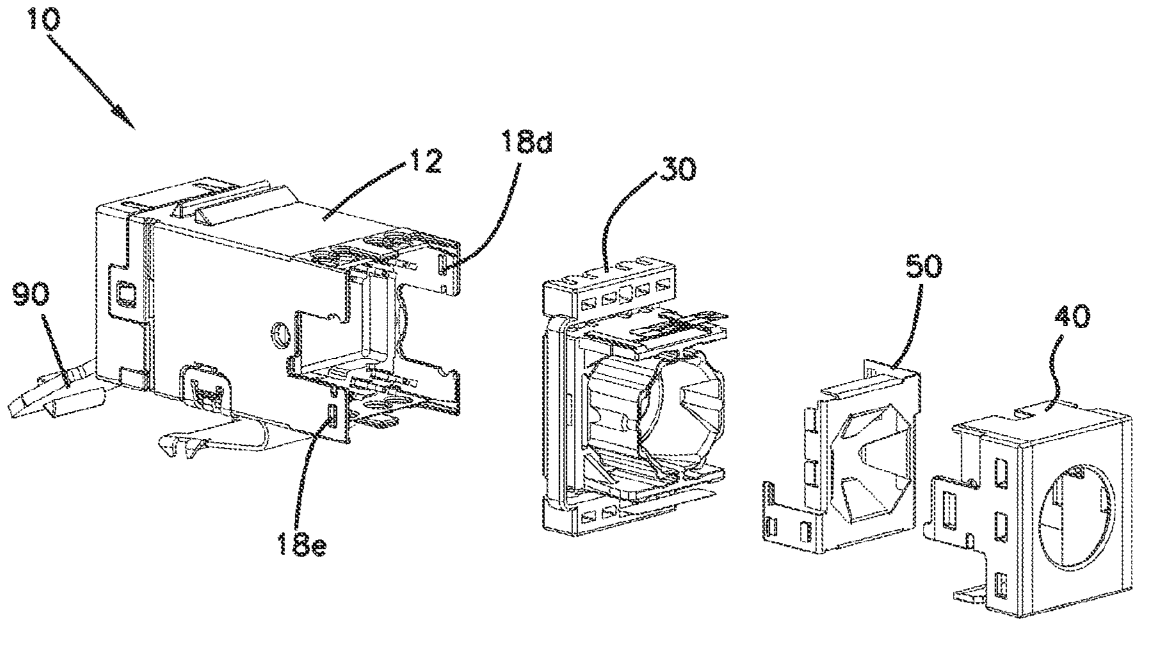
FIG. 7 is an exploded perspective view of the telecommunications connector shown in FIG. 1, with the cable manager part being shown as separated from the connector part, and with a rear housing, grounding part, and lacing fixture of the cable manager part being separated.
Figure 8:
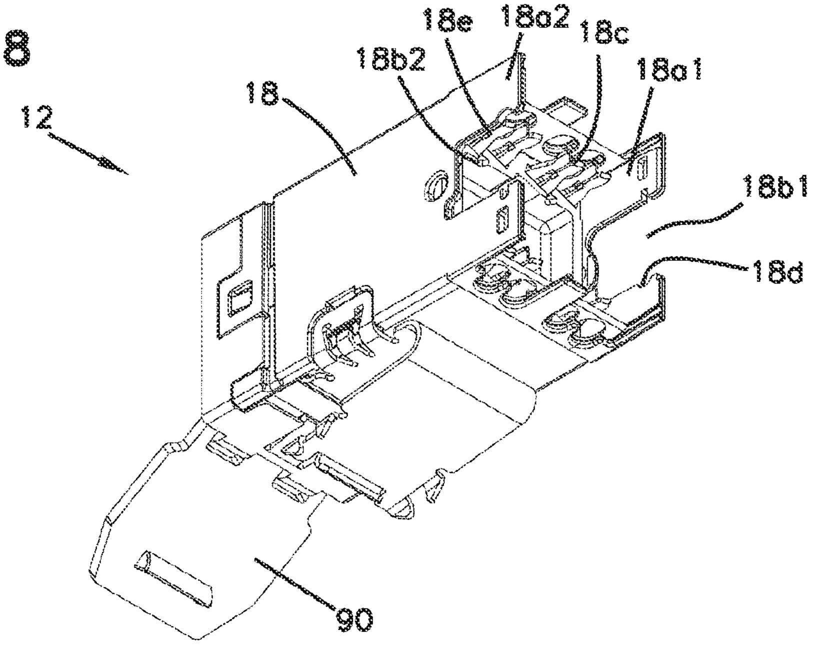
FIG. 8 is a rear perspective view of the connector part shown in FIG. 1.
Figure 9:
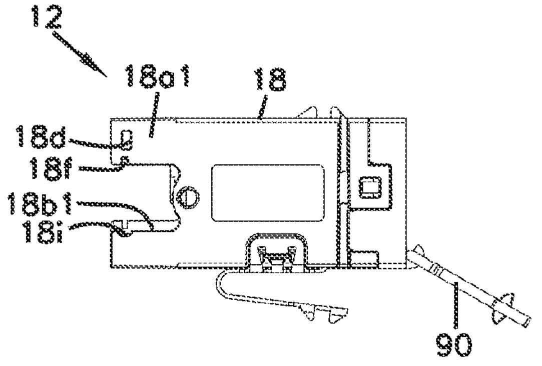
FIG. 9 is a first side view of the connector part shown in FIG. 8.
Figure 10:
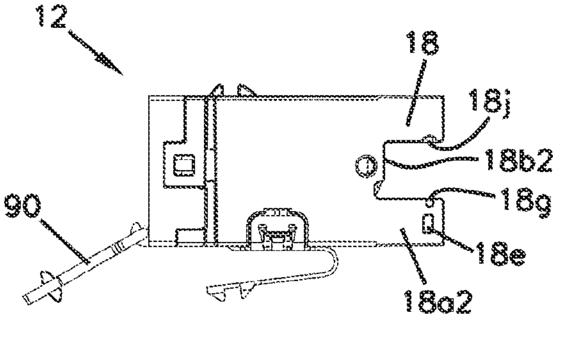
FIG. 10 is a second side view of the connector part shown in FIG. 8.
Figure 11:
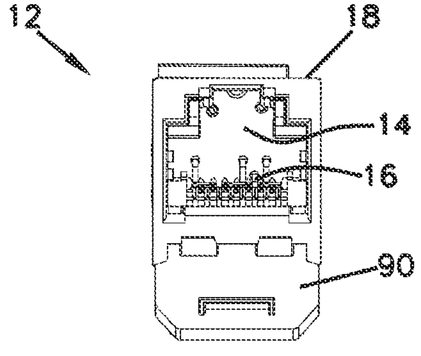
FIG. 11 is a front view of the connector part shown in FIG. 8.
Figure 12:
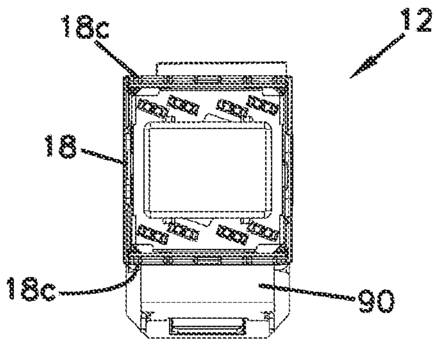
FIG. 12 is a rear view of the connector part shown in FIG. 8.
Figure 13:
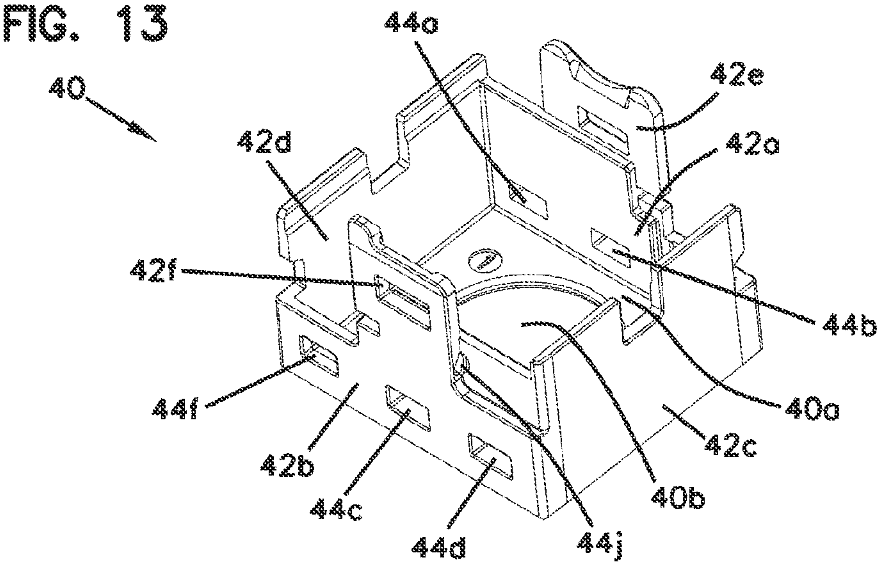
FIG. 13 is a perspective view of a rear housing of the cable manager part shown in FIG. 1.
Figure 14:
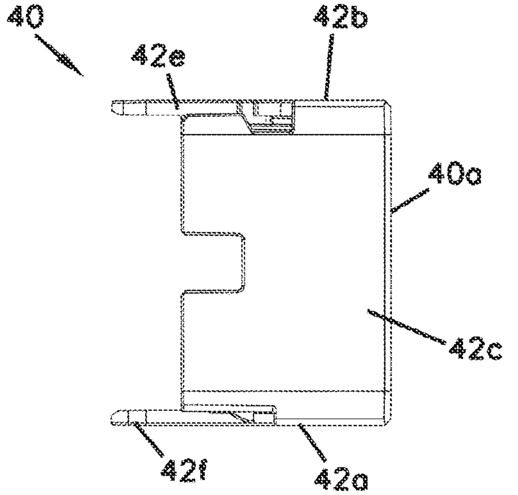
FIG. 14 is a side view of the rear housing shown in FIG. 13.
Figure 15:
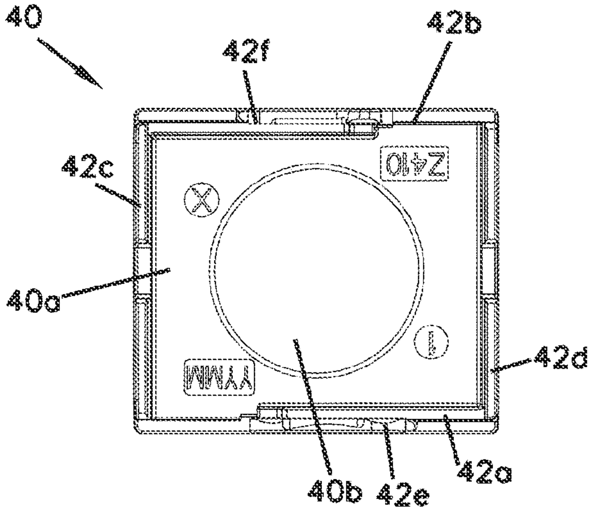
FIG. 15 is a front view of the rear housing shown in FIG. 13.
Figure 16:
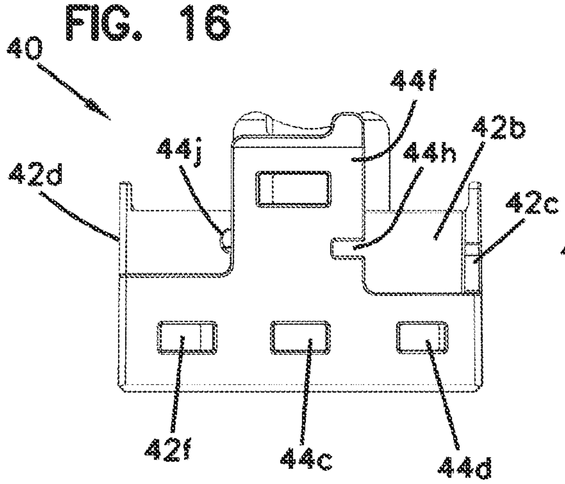
FIG. 16 is a second side view of the rear housing shown in FIG. 13.
Figure 17:
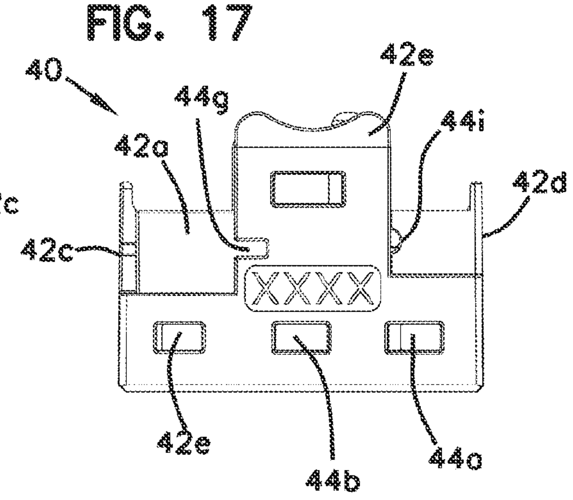
FIG. 17 is a third side view of the rear housing shown in FIG. 13.
Figure 18:
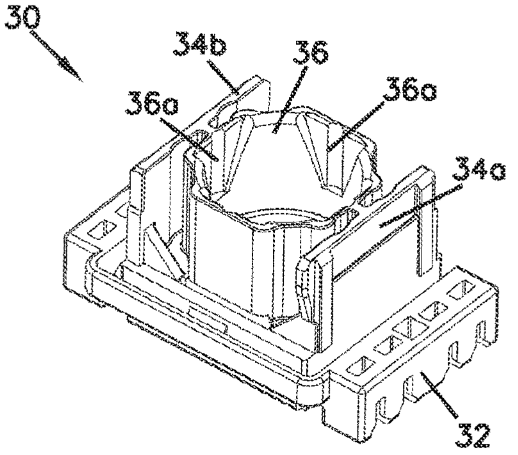
FIG. 18 is a rear perspective view of a lacing fixture of the cable manager part shown in FIG. 1.
Figure 19:
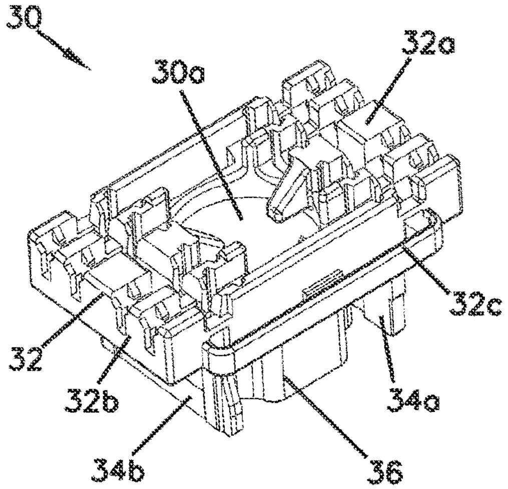
FIG. 19 is front perspective view of the lacing fixture shown in FIG. 18.
Figure 20:
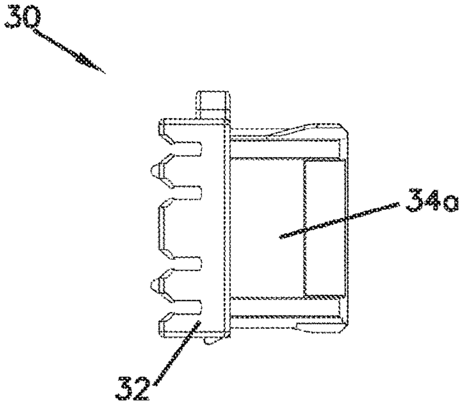
FIG. 20 is a first side view of the lacing fixture shown in FIG. 18.
Figure 21:
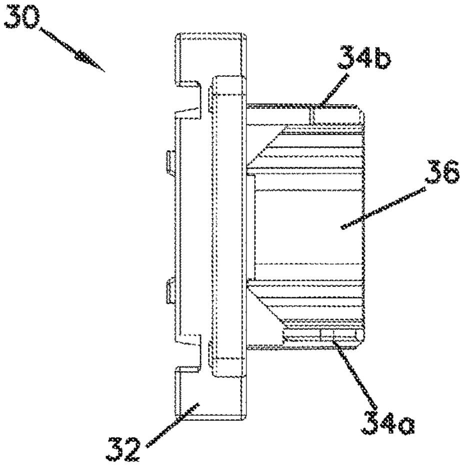
FIG. 21 is a second view of the lacing fixture shown in FIG. 18.
Figure 22:
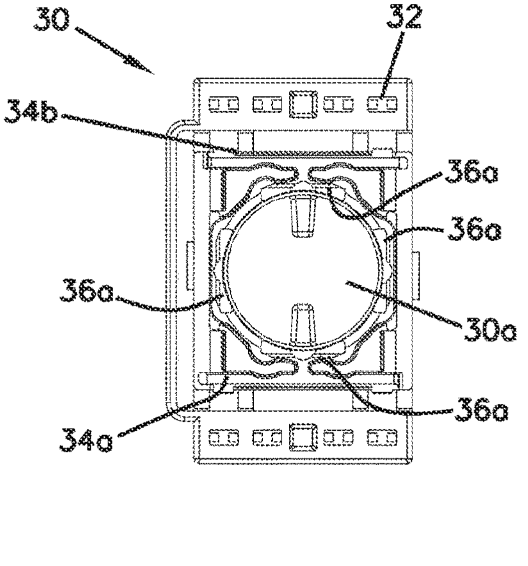
FIG. 22 is a rear view of the lacing fixture shown in FIG. 18.
Figure 23:
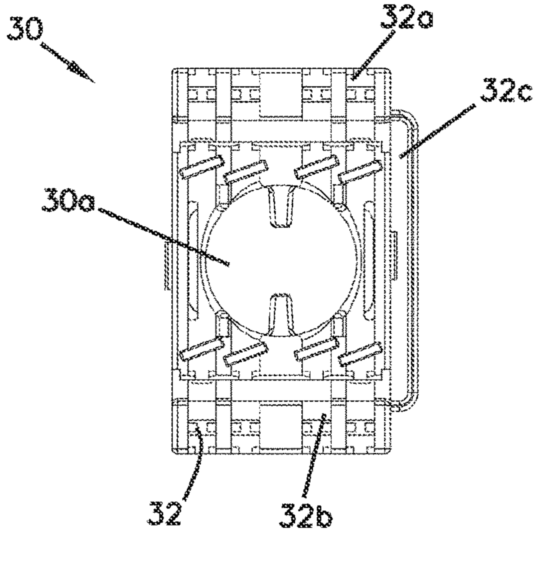
FIG. 23 is a front view of the lacing fixture shown in FIG. 18.
Figure 24:
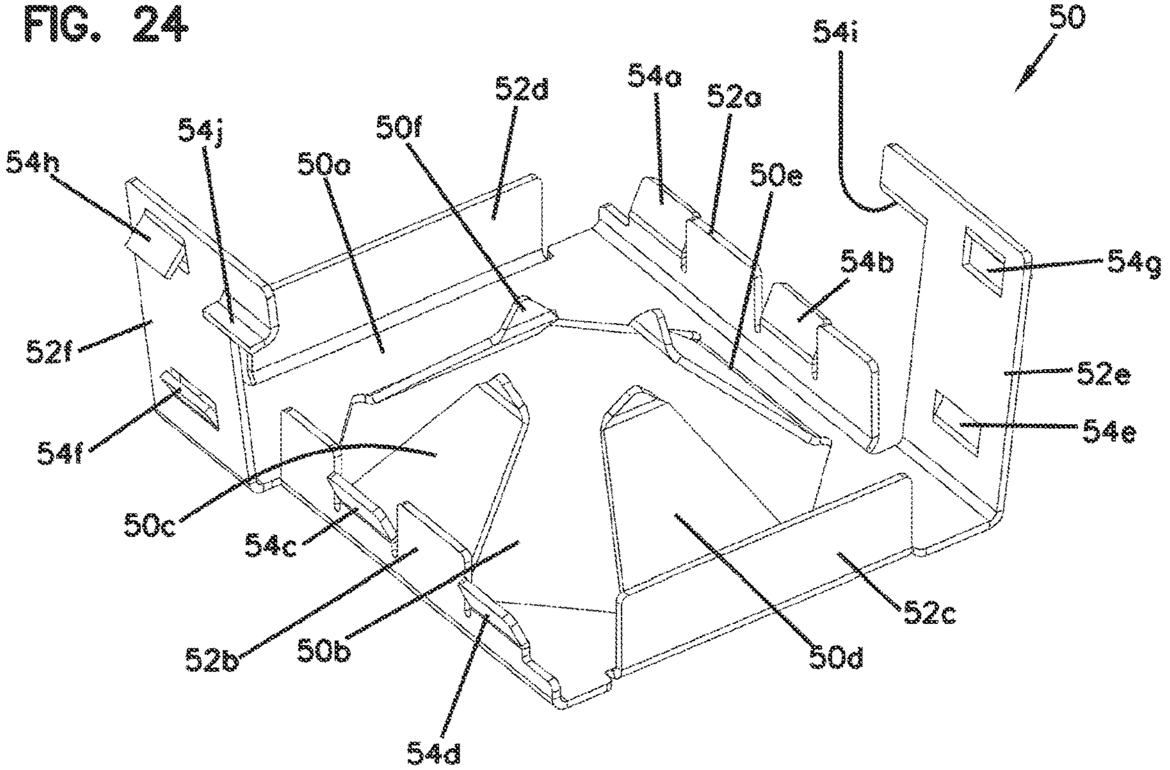
FIG. 24 is a perspective view of a grounding part of the cable manager part shown in FIG. 1.
Figure 25:
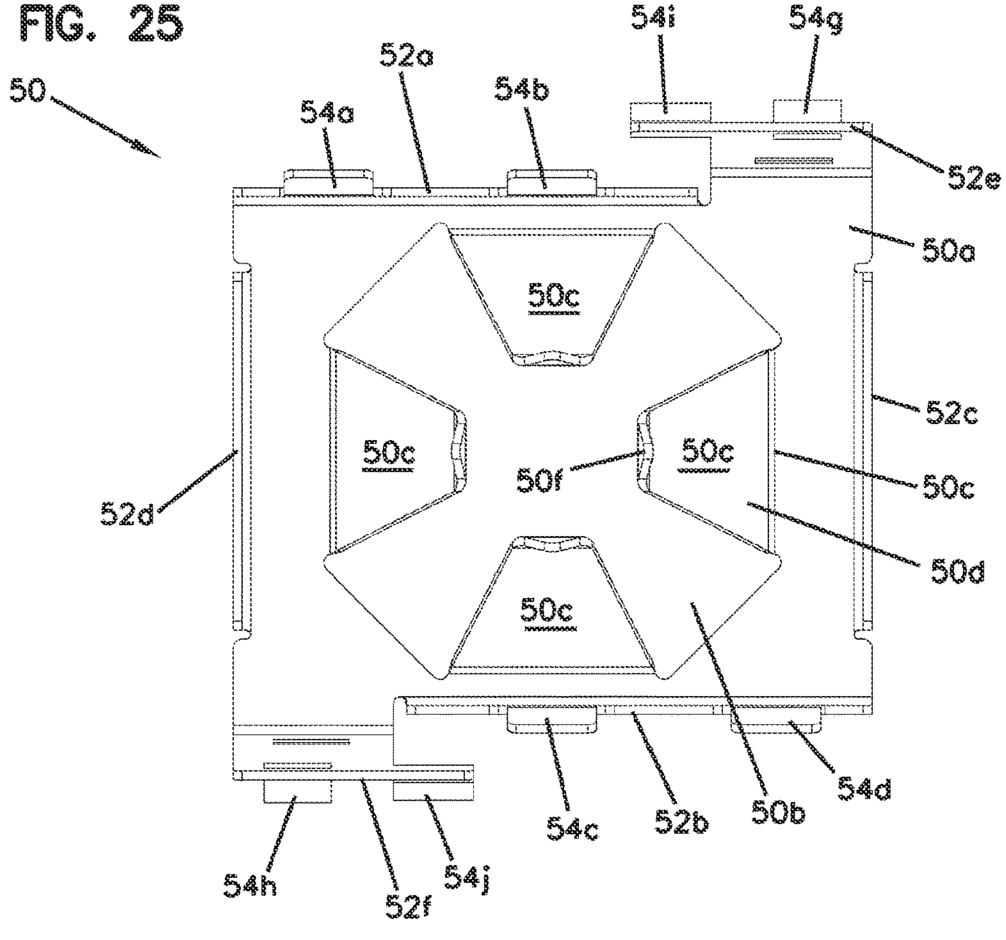
FIG. 25 is a front view of the grounding part shown in FIG. 24.
Figure 26:
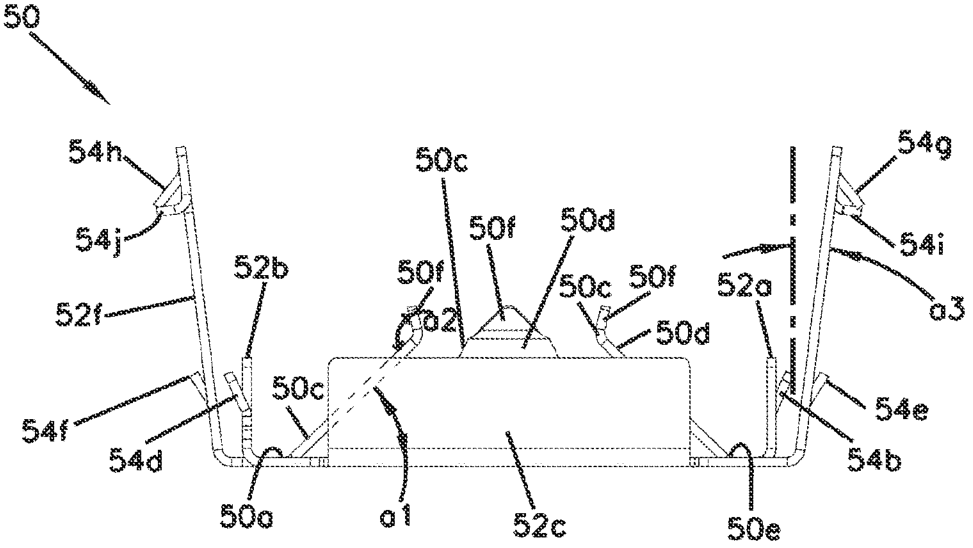
FIG. 26 is a first side view of the grounding part shown in FIG. 24.
Figure 27:
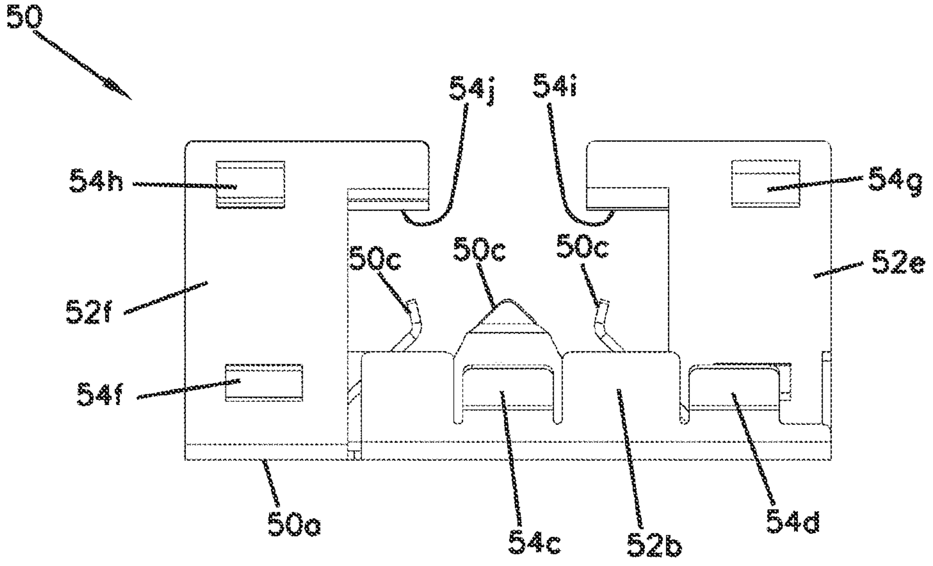
FIG. 27 is a second side view of the grounding part shown in FIG. 24.

The assembled cable manager part 20 with the lacing fixture part 30 and grounding part 50 mounted to the rear housing 40 can be seen at FIG. 6. At this stage, the cable manager part 20 can be secured to the connector part 12. As noted above, this is accomplished by aligning the cable manager part sidewalls 42*e*, 42*f* with the corresponding recess 18*b*1, 18*b*2 on the front housing 18. As the two components 12, 20 are brought together, the tabs 54*g*, 54*h* respectively latch into recesses 18*d*, 18*e* in the sidewalls 18*a*1, 18*a*2. Because the grounding part 50 is latched to the rear housing 40, this final latching secures the rear housing 40 to the front housing 18 with the lacing fixture part 30 sandwiched between. To further aid in retaining the rear housing 40 to the front housing 18, the front housing 18 can be provided with recesses 18*i*, 18*j* which receive corresponding protrusions 44*i*, 44*j* on the rear housing part 40 such that a snap-fit type connection is achieved. This feature provides increased retention force between the two housings 18, 40. Once the cable manager part 20 is fully assembled onto the front housing 18 and the termination process is complete, portions 32*a*, 32*b*, and 32*c* of the lacing fixture 30 are removed such that the lacing fixture 30 does not extend beyond the outer profile defined by the front housing 18. FIGS. 1-5 show the lacing fixture 30 with the portions 32*a*, 32*b*, 32*c* removed.

With reference to FIGS. 2 and 3, it can be seen that a gap 60 is formed between the housings 18, 40, after assembly, such that a portion of the extension arms 52*e* 52*f*, is exposed. This gap 60 serves as access to deflect the latch using the flat blade of a screwdriver to deflect the extension arms 52*e*, 52*f* by inserting and twisting the blade. This action causes the tabs 54*g*, 54*h* to be disengaged from recesses 44*g*, 44*h*, thereby allowing for removal of the rear assembly for re-termination. Material of the lacing fixture 30 rests behind the lower part of the extension arms 52*e*, 52*f* and prevents the latches 54*e*, 54*f* from becoming separated from the rear housing during this action.

In one aspect, the disclosed cable manager part 20 can accommodate a variety of differently sized cables 4. For example, cables 4 ranging between 4.6 millimeters to 9 millimeters in diameter can be accepted and grounded by the same cable manager part. Additionally, no active steps are required on the part of the installer to ground the cable to the connector assembly 10 once the cable 4 is properly stripped and inserted into the cable manager part. This is in contrast to other designs where a clamp must be actively opened or closed by the installer during insertion.

Figure 28:
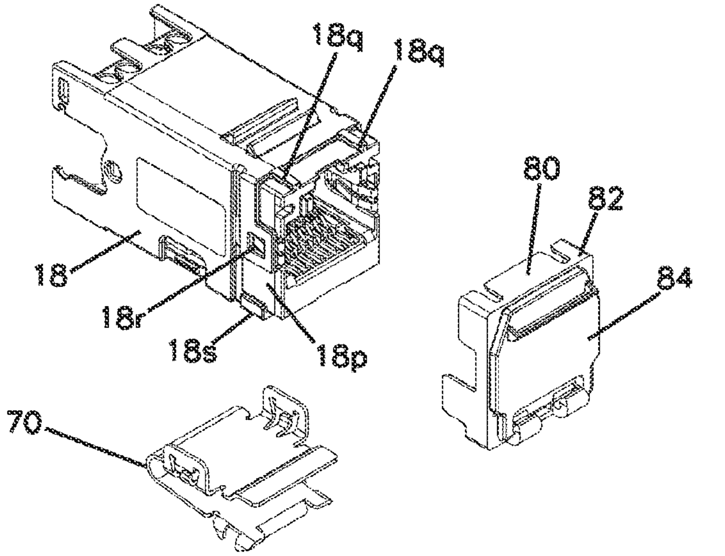
FIG. 28 is an exploded view of the front housing part, latch member, and cover assembly of the cable manager part shown in FIG. 1.

With reference to the exploded view in FIG. 28, the front housing part 18 of the connector assembly 10, a latch member 70 connectable to the front housing part 18, and a cover assembly 100 also connectable to the front housing part 18 are shown. FIGS. 29-32 additionally show the isolated front housing part 18. The front housing part 18 is provided with several features that enable the latch member 70 and cover assembly 100 to be connected to the front housing part 18. For example, the front housing part 18 is provided with a pair of recessed regions 18*k* defined by sidewalls 18*m* that is recessed from the main sidewalls 18*a*1, 18*a*2 and a latching protrusion 18*n* extending from each sidewall 18*m*. The front housing part 18 includes a perimeter wall 18*p* and a plurality of raised structures 18*q*, 18*r*, 18*s* that cooperatively receive the cover assembly 100 in sliding or press-fit manner. The front housing part 18 additionally includes a latch recess 18*t* for retaining the cover assembly 100 onto the front housing part 18.

Referring to FIGS. 33 to 38, the latch member 70 is shown in isolation. In one aspect, the latch member 70 can be removably attached to the front housing part 18. The latch member 70 is for securing the connector assembly 10 within an opening of a connector panel. In one example, the latch member 70 is a unitary structure formed from a metal material, such as steel. A plastic material may also be used, although metal is preferred due to more suitable strength and flexibility properties, and because metal allows the latch member 70 to be made from a relatively thin material. Where metal is used, the latch member 70 can also serve to provide a grounding pathway.

As most easily seen at FIGS. 33-38, the latch member 70 can be provided with a first portion 72 and a second portion 74 that are joined by a third portion 76. As presented, the third portion 76 is curved or represents a bent portion of the latch member 70 such that the third portion 76 enables the latch member to perform a spring function. As shown, the third portion 76 holds the first portion 72 at an non-zero angle with respect to the second portion 74.

In one aspect, the first portion 72 extends to a free end 72*a* and includes a pair of locking rib structures 78, wherein each of the locking ribs includes a first rib 78*a* and a spaced apart second rib 78*b*. The locking rib structures 78 are for engaging with the connector panel. Once installed, the first ribs 78*a* engage a front side of the connector panel while the second ribs 78*b* engage a back side of the connector panel such that the connector assembly 10 is locked in place into the opening of the connector panel. An example connector panel and a latch member with overlapping features with latch member 70 is shown and described in PCT Publication WO 2016/156644, the entirety of which is incorporated by reference herein.

In another aspect, the second portion 74 includes a retention structure 80. The retention structure 80 is for providing a secure connection between the latch member 70 and the front housing part 18 of the connector assembly 10. As shown, the retention structure 80 includes a pair of tabs 82 extending generally orthogonally from the latch member second portion 74. In one aspect, the tabs 82 are shaped to fit within the recess regions 18*k* defined in the front housing part 18 (i.e. the profiles of the tabs 82 and recessed regions 18*k* match or the profile of the tabs 82 is smaller than that of the recessed regions 18*k*). The recess regions 18*k* are generally of a depth that matches a thickness of the tabs 82. Accordingly, once the latch member 80 is installed onto the front housing part 18, a flush configuration results in which the tabs 82 do not extend past the sidewall surfaces 18*a*1, 18*a*2 of the housing part 18. In one aspect, the tabs 82 define an open region 84 for receiving the latching protrusion 18*t* on the front housing part 18. This arrangement facilitates a snap-fit type of connection between the latch member 70 and the front housing part 18. As with other similar types of connections described herein, the latch member 70 could be provided with protrusions similar to protrusions 18*t* while the front housing part 18 could be provided with recesses similar to open regions 84.

Referring to FIGS. 39-44, the cover assembly 100 is shown in isolation. As shown, the cover assembly 100 includes an outer perimeter wall 102 that extends to an end wall 104 having an aperture 104*a* that provide access to the jack cavity 14. The outer perimeter wall 102 is configured to slide over the perimeter wall 18*p* of the front housing part 18 and between the raised structures 18*q*, 18*r*, 18*s*. The outer perimeter wall 102 is provided at a thickness that is the same as the raised structures 18*q*, 18*r*, 18*s*, thereby enabling the cover assembly 100 outer profile to match that of the front housing part 18. A latch extension 106 is also provided that includes a latch member 106*a* that engages with the latch recess 18*t* of the front housing part 18. This configuration allows for the cover assembly 100 to form a secure, snap-fit type of connection with the front housing part 18.

In one aspect, the cover assembly 100 includes a pair of female hinge members 108 extending from the end wall 104. The female hinge members 108 receive a male hinge member 96 on a cover portion 90 of the cover assembly 100 such that the cover portion 90 can rotate between open and closed positions. In the open position, the cover portion 90 provides access to the jack cavity 14. In the closed position, the cover portion 90 acts as a dust cover for the jack cavity 14. As shown, the cover portion 90 includes a handle 92 for aiding an operator to digitally manipulate the position of the cover portion 90. The cover portion 90 is also shown as having a pair of protrusions 94 on the opposite side from the handle 92. The protrusions 94 engage interior portions of the jack cavity 14 in a frictional manner to aid in retaining the cover portion 90 in the closed position.

Referring to FIGS. 45-50, a cap 100' is shown that is largely identical to the cover assembly 100. Accordingly, similar features need not be repeated here. The cap 100' is different from the cover assembly 100 in that a cover portion 90 is not provided, thereby leaving the jack receptacle 14 exposed through the opening 104' of the cap 100'. Thus, the cap 100' is also not provided with the female hinge members that are present on the cover assembly 100. Where it is desired to add a cover portion to the cap 100', a recess 108' is provided to receive and secure an extension portion of a removable cover portion.

Figure 59:
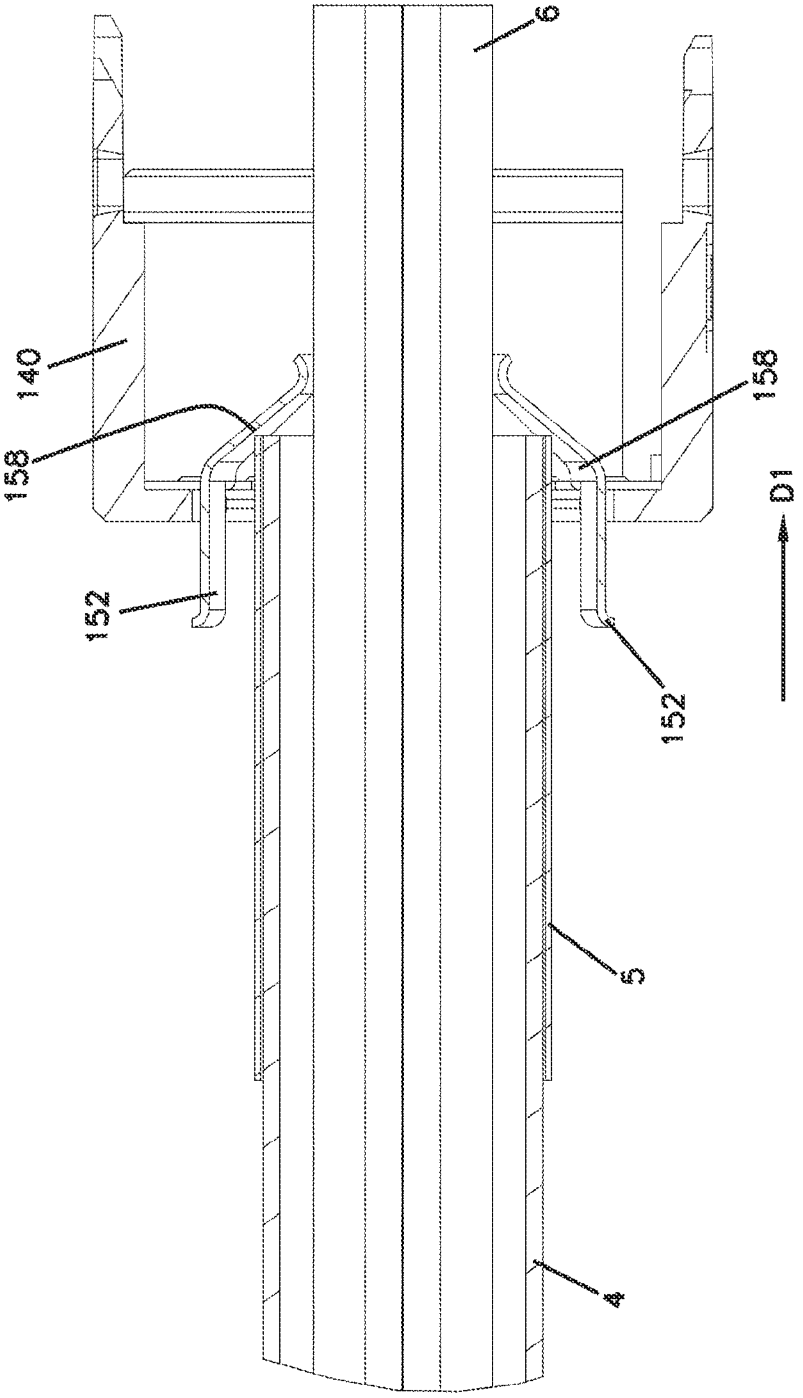
FIG. 59 is a cross-sectional of the cable manager part and cable shown in FIG. 55, taken along the line 59, 60 in FIG. 58, with the cable being partially inserted.
Figure 60:
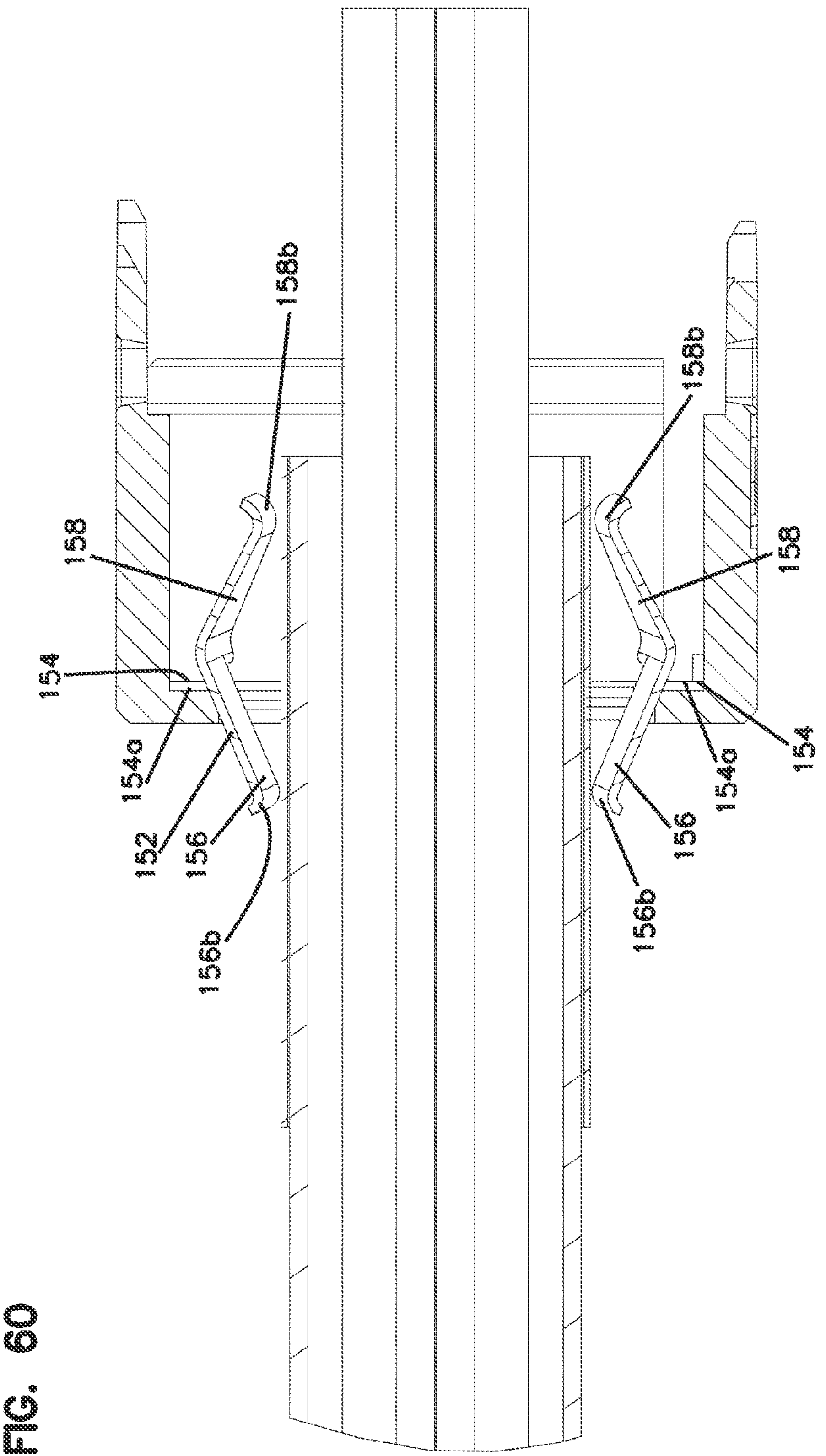
FIG. 60 is a cross-sectional of the cable manager part and cable shown in FIG. 55, taken along the line 59, 60 in FIG. 58, with the cable being fully inserted.

An alternative configuration for a connector assembly 110 including a connector part 112, a cable manager part 120, and grounding arrangement 150 is illustrated at FIGS. 53 to 63. The connector part 112 is generally similar to connector part 12 and like reference numbers (e.g. 112 instead of 12) are therefore used for the same features. In one aspect, the cable manager part 120 is provided with a rear housing 140 to which the grounding arrangement 150 is attached. The grounding arrangement 150 makes grounding contact with the cable sheath 5 such that grounding contact is established between the rear housing 140 and the sheath 5. The cable manager part 120 is in grounding contact with the connector part 112. Accordingly, the grounding arrangement 150 operates to facilitate grounding contact between the sheath 5 and the connector part 112 as can be seen at FIG. 60.

Figure 61:
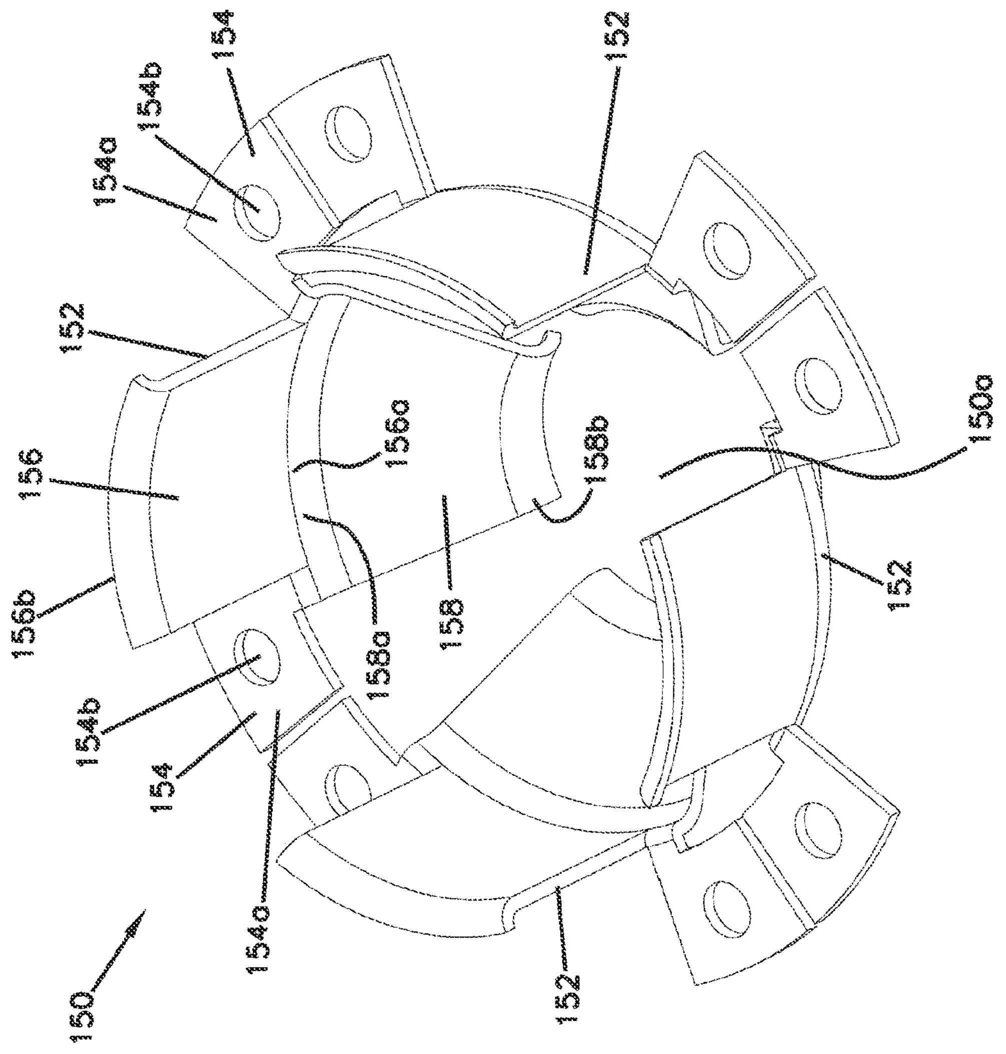
FIG. 61 is a perspective view of a grounding arrangement of the cable manager part shown in FIG. 55.
Figure 63:
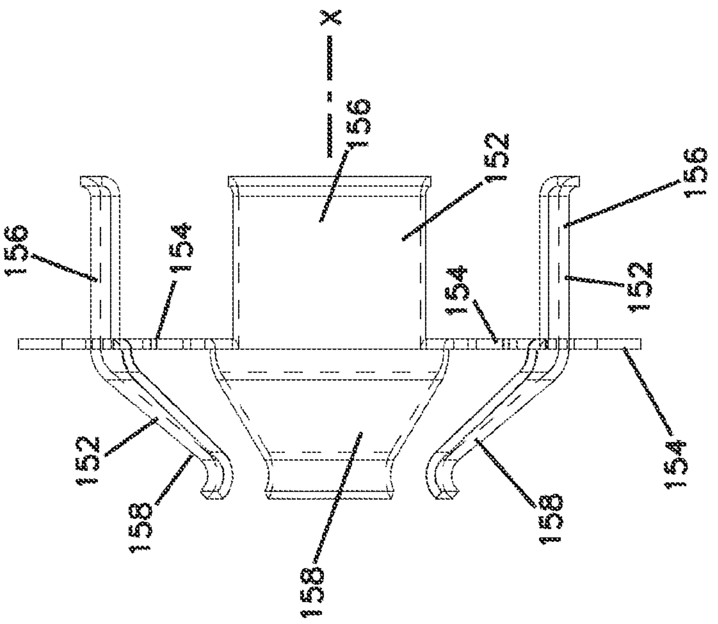
FIG. 63 is a side view of the grounding arrangement shown in FIG. 62
Figure 62:
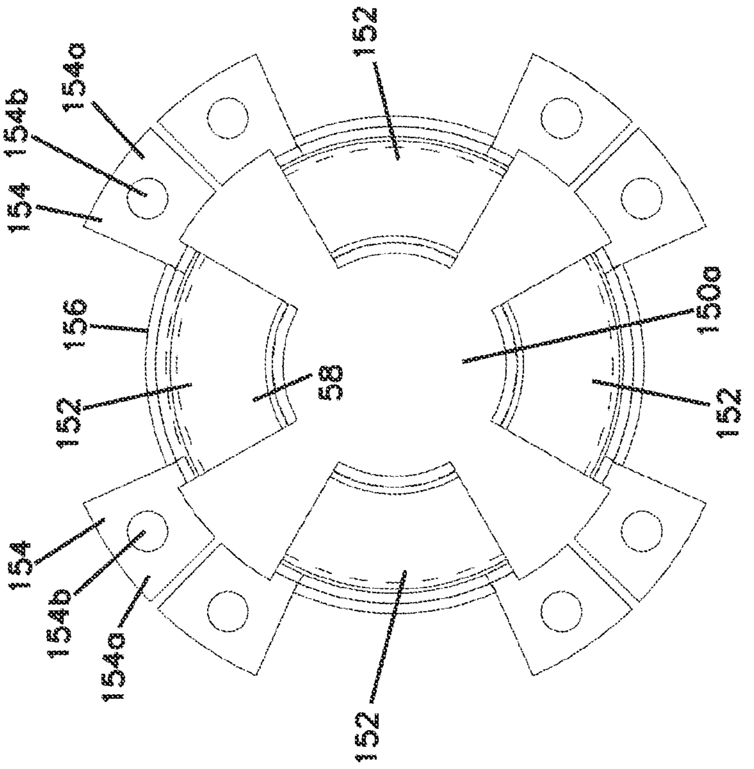
FIG. 62 is a top view of the grounding arrangement shown in FIG. 61.

The grounding arrangement 150 is shown in isolation at FIGS. 61 to 63. In the example shown, the grounding arrangement 150 is formed by a plurality of grounding members 152 arranged to form a central opening 150*a* through which the cable 4 can be inserted. Each grounding member 152 is shown as being provided with a pair of mounting members 154 having a base portion 154*a* with an aperture 154*b*. The grounding members 152 can be secured to the rear housing 140 via the apertures 154*b* with separate fasteners or with material of the rear housing 140 extending through the apertures 154*b*. Each grounding member 152 is also provided with a sidewall member 156 extending from a first end 156*a*, proximate the mounting members 154, to second end 156*b*. As shown, the second end 156*b* is provided with an outwardly radiused or curved profile to ensure that the cable 4 is not presented to a sharp edge when being inserted past the second end 156*b* and in a direction towards the central opening 150*a*. Each of the grounding members 152 is also shown as being provided with a flange member 158 extending away from the mounting member 154 and sidewall member 156. The flange member 158 is shown as extending from a base end 158*a* adjacent the sidewall member first end 156*a* to a second end 158*b*. As shown, the second end 158*b* is provided with an outwardly radiused or curved profile to ensure that the cable 4 is not presented to a sharp edge when being removed from the grounding arrangement. The flange member 158 extends at an oblique angle from the base end 158*a* (and at an oblique angle to the longitudinal axis X of the grounding arrangement 150 and cable manager part 20) towards the central opening 150*a* such that contact with the cable sheath 5 is made when a cable 4 is inserted. The flange members 158 deflect away from the central opening 150*a* when a cable 4 is inserted and maintain contact against the sheath 5 by virtue of a resulting spring force of the grounding arrangement 150. With the disclosed design, a variety of oblique entry angles (i.e. oblique angle between longitudinal axis of the cable 4 and the longitudinal axis X of the grounding arrangement 150 extending through the center of the opening 50) of the cable 4 can be accommodated by virtue of the grounding member sidewall members 156 being initially larger than the diameter of the cable 4 up to the point that the end of the cable 4 contacts the flange members 158.

In one aspect, the grounding arrangement 150 can be formed from a metal material, such as stainless steel or a copper alloy. Also, each of the grounding members 152 can be formed from an initially flat sheet stock which can be cut and then bent into the shape shown in the drawings. In an alternative embodiment, the grounding arrangement 150 can be integrally formed with interconnected grounding members 152 rather than by separate grounding members 152, as shown in the drawings.

As most easily seen at FIGS. 55-59, the rear housing 140 includes an end wall 140*a* defining a central aperture 140*b*. The rear housing also includes sidewalls 142*a*, 142*b*, 142*c*, and 142*d* which extend from the end wall 140*a*. Together, the sidewalls 142*a*-142*d* and the end wall 140*a* form an interior cavity into which the grounding arrangement 150 is received. The grounding arrangement 150 is mounted to the end wall 140*a* such that the central opening 150*a* of the grounding arrangement 150 is coaxially aligned with the central aperture 140*b*. As configured, the base portions 154*a* of the grounding arrangement 150 are supported against the rear housing end wall 140*a* and are secured to the end wall 140*a* via protrusions 140*c* extending from the end wall 140*a*. The protrusions 140*c* can be shaped for a snap-fit type connection with the base portions 154*a* or can be initially formed as posts which are deformed to form a securing cap after the grounding arrangement 150 is mounted. Many other approaches for securing the grounding arrangement 150 to the end wall 140*a* are possible, for example, mechanical fasteners, soldering, welding, and/or adhesives may be used.

Figure 55:
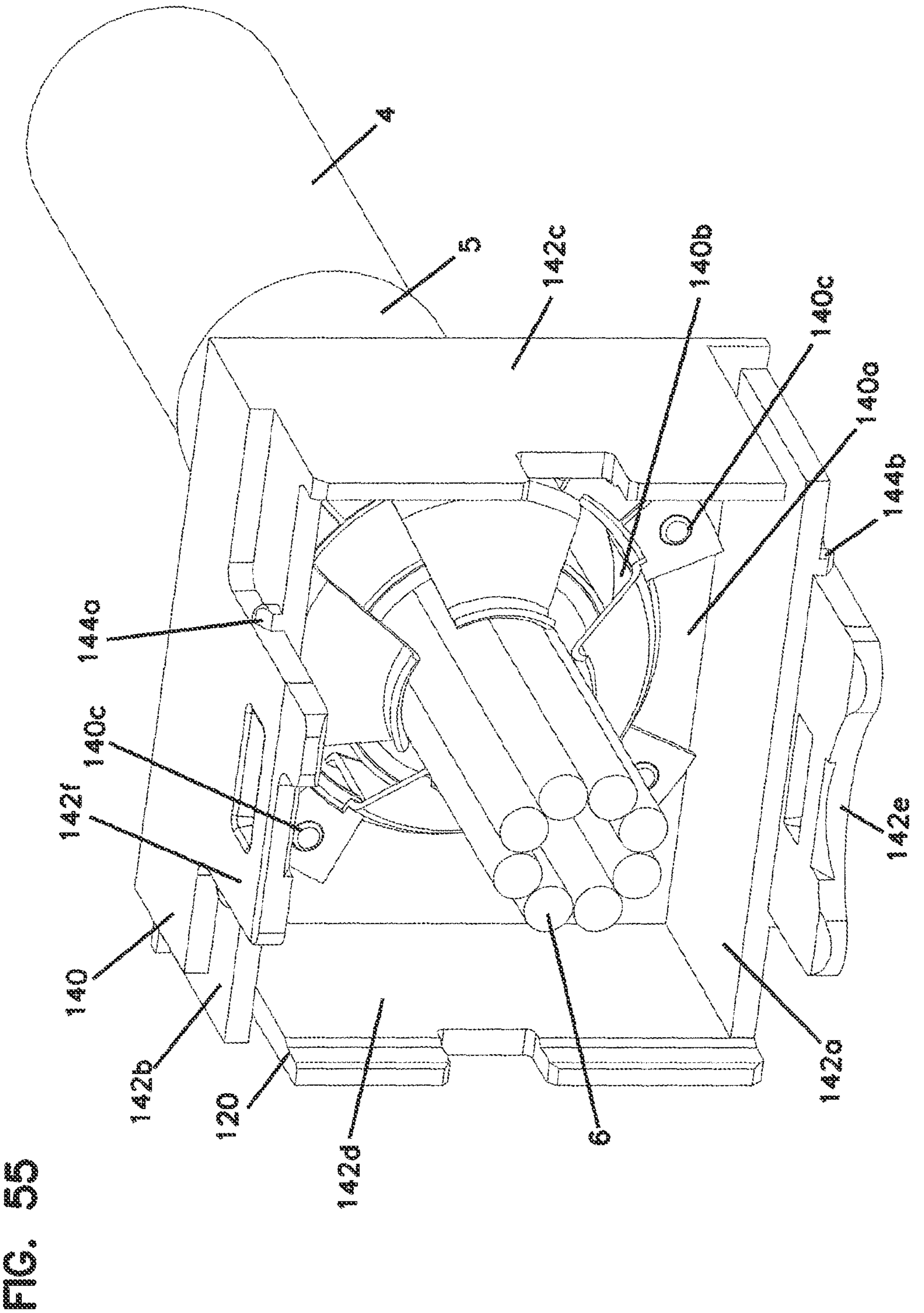
Figure 56:
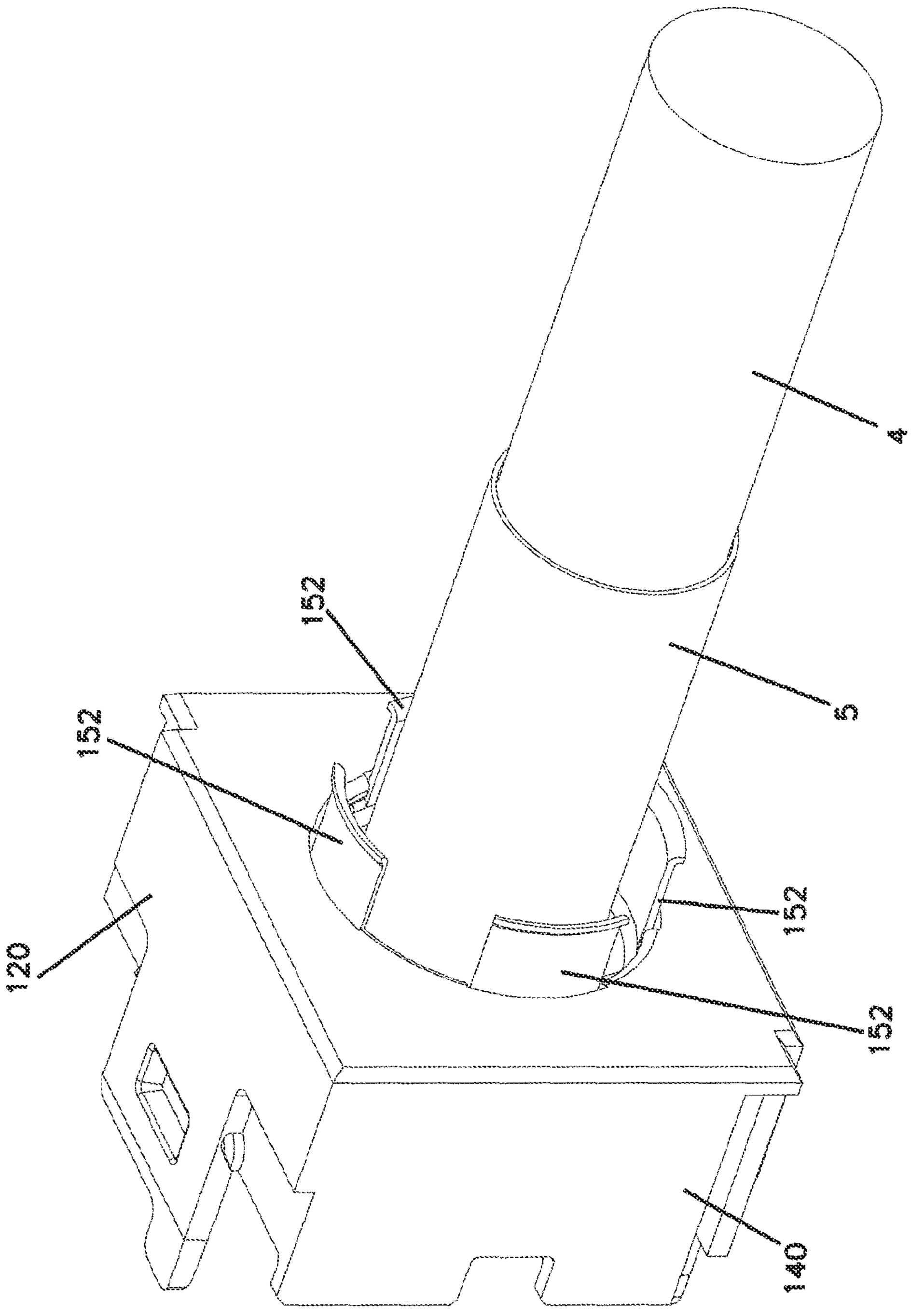
FIG. 56 is a second perspective view of the cable manager part and cable shown in FIG. 55.
Figure 57:
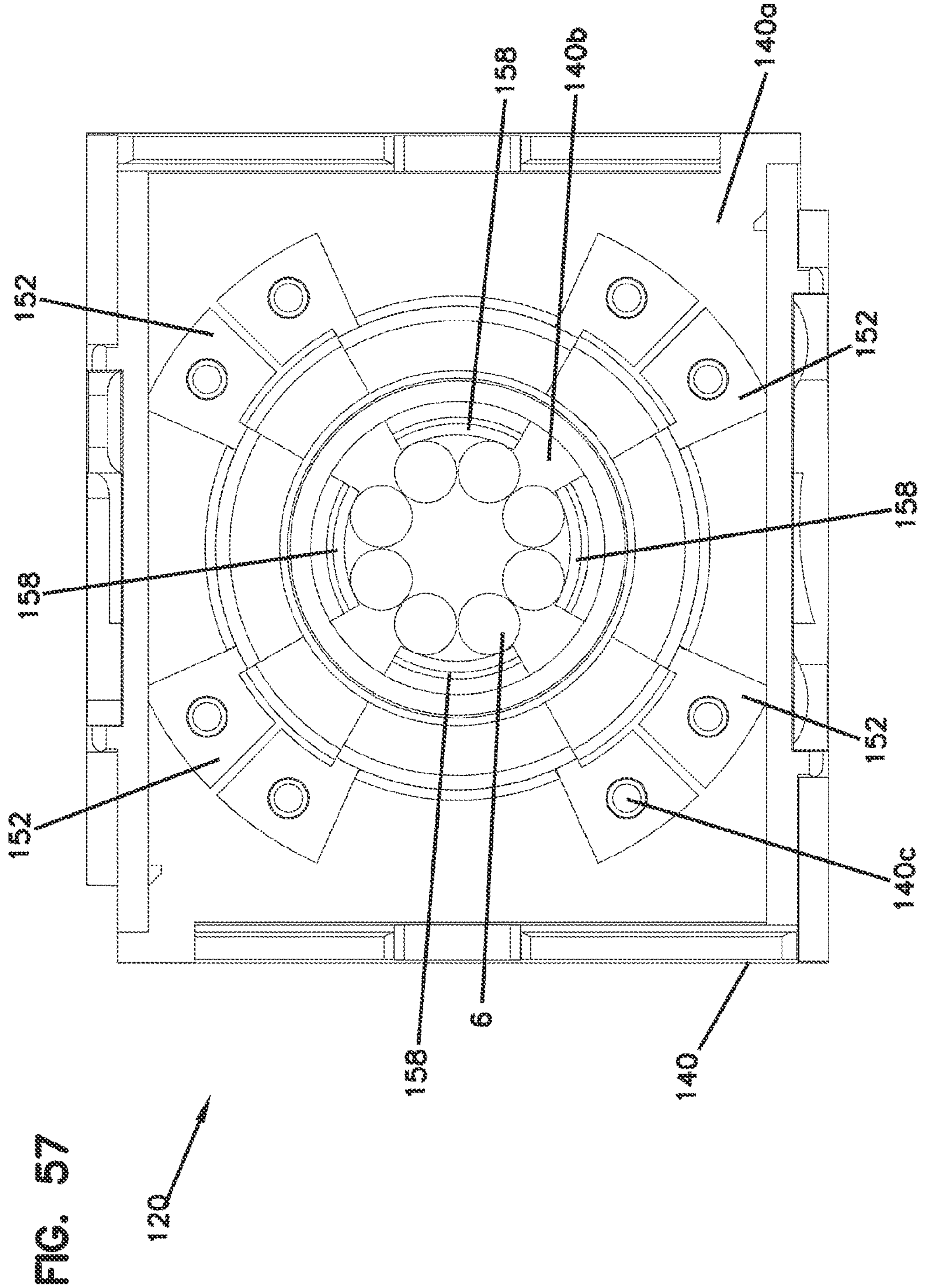
FIG. 57 is a front end view of the cable manager part and cable shown in FIG. 55.
Figure 58:
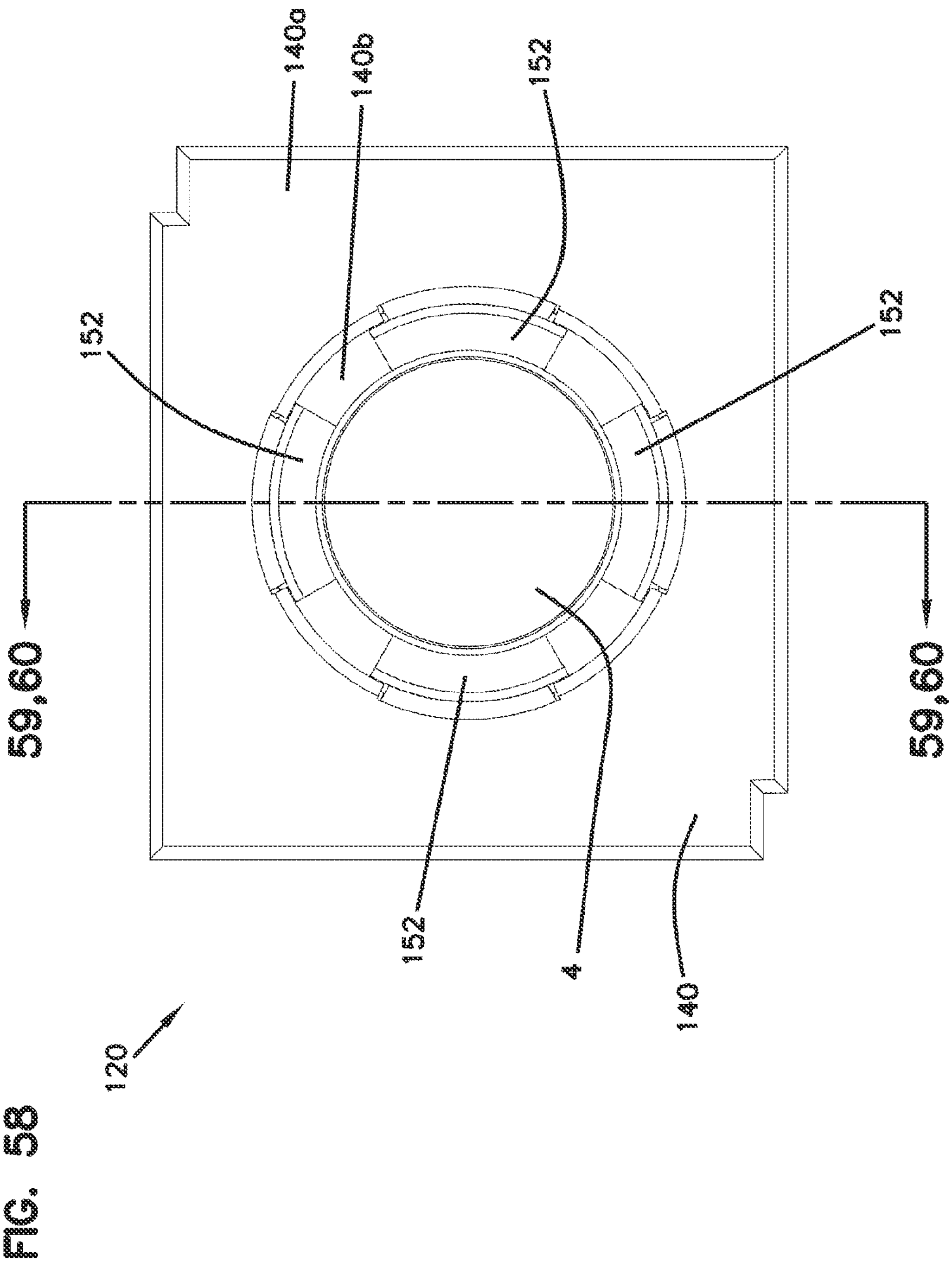
FIG. 58 is a rear end view of the cable manager part and cable shown in FIG. 55.

The rear housing 140 is also shown as including projecting sidewalls 142*e*, 142*f* which respectively extend from sidewalls 142*a*, 142*b*. In one aspect, the connector part 112 and the cable manager part sidewalls 142*e*, 142*f* may be configured in a complementary manner, so that the connector part 112 is able to engage with the cable manager part 120 only in one orientation. For example, the recess portion 118*b*1 on one side of the front housing 118 may be configured with a different size and/or shape than the recess portion 118*b*2 on the opposite side of the front housing 118. As can be seen at FIGS. 55 and 56, each of the projecting sidewalls 142*e*, 142*f* is provided with a different shape corresponding to the recess portion 118*b*1, 118*b*2 into which it is intended to be received within. Accordingly, the rear housing 140 can only be fully engaged and connected to the front housing 118 in only a single orientation. To aid in retaining the rear housing 140 to the front housing 118, the front housing 118 can be provided with recesses 118*d*, 118*e* which receive corresponding protrusions 144*a*, 144*b* on the rear housing part 140 such that a snap-fit type connection is achieved.

The assembled cable manager part 120 with the grounding arrangement 150 mounted to the rear housing 140 can be seen at FIGS. 55-60. At this stage, the cable manager part 120 can be secured to the connector part 112. As noted above, this is accomplished by aligning the cable manager part sidewalls 142*e*, 142*f* with the corresponding recess 118*b*1, 118*b*2 on the front housing 118. As the two components 112, 120 are brought together, the protrusions 144*a*, 144*b* respectively engage with recesses 118*d*, 118*e* to secure the front and rear housings 118, 140 together. Because the grounding arrangement 150 is secured to the rear housing 140, the securement of the rear housing 140 to the front housing provides a grounding pathway between the grounding arrangement 150 and the front housing 118.

Referring to FIGS. 59 and 60, the assembled cable manager part 120 is shown with a cable 4 being inserted in an insertion direction D1 through the central aperture 140*b* of the rear housing 140 and central opening 150*a* of the grounding arrangement 150. At FIG. 59 (see also FIG. 55), the cable 4 has been inserted up to the point that the flange members 158 contact the end of the outer jacket and exposed sheath 5 of the cable 4. By this position of the cable 4, the individual wires 6, which have been stripped from the jacket and sheath 5, have passed through the openings 140*b*, 150*a*. As the cable 4 is further inserted in direction D1, the cable 4 forces the flange members 158 to deflect away from the central opening 150*a* and a resulting spring force holds the flange members 158 against the cable sheath 5. As can be best seen at FIG. 60, the deflection of the flange members 158 occurs by bending about the base portions 154*a* proximate the base end 158*a* of the flange members 158. As this bending occurs, the sidewall members 156 move with the flange members 158 such that their second ends 156*b* are brought towards the central opening 150*a*. As the cable 4 becomes fully inserted, the second ends 156*b* are brought against the cable sheath 5 such that two points of grounding contact (i.e. ends 158*b*, 156*b*) between the grounding members 152 and the sheath 15 is established. An additional spring force between the sidewall members 156 and the flange members 158 is created by virtue of resulting bending occurring between the sidewall member 156 and the flange member 158 due to having two point of contact. This additional spring force further secures the cable 4 to the cable manager part 120.

In one aspect, the disclosed cable manager part 120 can accept a cable 4 having a variety of oblique entry angles. Additionally, no active steps are required on the part of the installer to ground the cable to the connector assembly 110 once the cable 4 is properly stripped and inserted into the cable manager part 120. This is in contrast to other designs where a clamp must be actively opened or closed by the installer during insertion. Many materials can be used for the components of the disclosed connector assembly 10.

Many materials can be used for the components of the disclosed connector assembly 10. For example, grounding part 50 can be formed from a metal material, such as plated copper alloy, stainless steel, and/or zinc die-casting.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

PARTS LIST

4 cable
5 conductive element/sheath
6 wires or filaments
10 connector assembly
12 connector part
14 jack cavity
16 electrical conductors
18 front housing
**18*a* conductive sidewalls (18*a*1, 18*a*2**)
**18*b* recess portions (18*b*1, 18*b*2**)
**18*c*** cutting edges
**18*d*** recess
**18*e*** recess
**18*f*** recess/slot
**18*g*** recess/slot
**18*i*** recess
**18*j*** recess
**18*k*** recess region
**18*m*** sidewall
**18*n*** latching protrusion
**18*p*** perimeter wall
**18*q*** raised structure
**18*r*** raised structure
**18*s*** raised structure
**18*t*** latch recess
20 cable manager part
30 lacing structure part
**30*a*** central aperture
32 lacing structure
**32*a*** removable portion of lacing fixture
**32*b*** removable portion of lacing fixture
**32*c*** removable portion of lacing fixture
**34*a*** sidewall
**34*b*** sidewall
36 perimeter wall structure
**36*a*** recess
40 rear housing
**40*a*** end wall
**40*b*** central aperture
**42*a*** sidewall
**42*b*** sidewall

42*c* sidewall
42*d* sidewall
42*e* projecting sidewall
42*f* projecting sidewall
44*a* recess
44*b* recess
44*c* recess
44*d* recess
44*e* recess
44*f* recess
44*g* recess/slot
44*h* recess/slot
44*i* protrusion
44*j* protrusion
50 grounding part
50*a* end wall
50*b* aperture
50*c* flange members
50*d* main portion
50*e* base end
50*f* tip portion
52*a* sidewall
52*b* sidewall
52*c* sidewall
52*d* sidewall
52*e* extension arm
52*f* extension arm
54*a* tab/latch
54*a* tab/latch
54*b* tab/latch
54*c* tab/latch
54*d* tab/latch
54*e* tab/latch
54*f* tab/latch
54*g* tab/latch
54*h* tab/latch
54*i* flange portion
54*j* flange portion
60 gap
70 latch member
72 first portion
72*a* free end
74 second portion
76 third portion
78 locking rib structure
78*a* first rib
78*b* second rib
80 retention structure
82 tabs
84 open region
90 cover portion
92 handle
94 protrusions
96 male hinge member
100 cover assembly
102 perimeter wall
104 end wall
104*a* aperture
106 extension member
106*a* latch member
108 female hinge members
100' cap
102' perimeter wall
104' end wall
104*a*' aperture
106' extension member
106*a*' latch member
108' recess
110 connector assembly
112 connector part
114 jack cavity
115 dust cover
116 electrical conductors
118 front housing
118*a* conductive sidewalls (18*a*1, 18*a*2)
118*b* recess portions (18*b*1, 18*b*2)
118*c* cutting edges
120 cable manager part
140 rear housing
140*a* end wall
140*b* central aperture
142*a* sidewall
142*b* sidewall
142*c* sidewall
142*d* sidewall
142*e* projecting sidewall
142*f* projecting sidewall
144*a* protrusion
144*b* protrusion
150 grounding arrangement
150*a* central opening
152 grounding member
154 mounting member
154*a* base portion
154*b* aperture
156 sidewall member
156*a* first end
156*b* second end
158 flange member
158*a* base end
158*b* second end
D1 insertion direction
X longitudinal axis

What is claimed is:

1. A telecommunications assembly comprising:

a. a connector extending from a front end, defining a jack cavity, to a rear end, defining a central opening for receiving a cable, the connector having a flat top, a bottom, and side portions defining a rectangular-shaped cross section; and b. a deflectable latch removably mounted to the connector via a pair of tabs received in oppositely positioned recesses on the connector such that the pair of tabs are flush with the flat side portions, wherein the deflectable latch includes a first portion, a second portion extending at a non-zero angle with respect to the first portion, and a third portion joining the first and second portions.

2. The telecommunications assembly of claim 1, wherein the oppositely positioned recesses each include a protrusion engaging with the pair of tabs of the deflectable latch.

3. The telecommunications assembly of claim 1, wherein the pair of tabs extend orthogonally from the second portion and wherein the second portion is adjacent the flat top portion of the connector.

4. The telecommunications assembly of claim 1, wherein the first portion includes a locking rib structure for engaging with a telecommunications panel.

5. The telecommunications assembly of claim 4, wherein the locking rib structure includes a pair of locking rib structures.

6. The telecommunications assembly of claim 1, wherein the deflectable latch is a unitary structure formed from a metal material.

7. The telecommunications assembly of claim 1, wherein the connector includes a front housing part, defining the jack cavity, and a rear housing part connected to the front housing part and defining the central opening, wherein the deflectable latch is removably mounted to the front housing part.

8. A multi-configuration telecommunications assembly comprising:

a. a connector extending from a front end, defining a jack cavity, to a rear end, defining a central opening for receiving a cable, the connector having a flat top, a bottom, and side portions defining a rectangular-shaped cross section;

b. a deflectable latch including a first portion, a second portion extending at a non-zero angle with respect to the first portion, a third portion joining the first and second portions, and a pair of tabs extending from the second portion;

c. wherein the assembly is placeable in a first configuration in which the deflectable latch is mounted to the connector such that the connector can be secured within an opening of a panel, wherein the pair of tabs are received in oppositely positioned recesses on the connector such that the pair of tabs are flush with the flat side portions; and d. wherein the assembly is placeable in a second configuration in which the deflectable latch is unmounted from the connector.

9. The multi-configuration telecommunications assembly of claim 8, wherein the oppositely positioned recesses each include a protrusion engaging with the pair of tabs of the deflectable latch.

10. The multi-configuration telecommunications assembly of claim 8, wherein the pair of tabs extend orthogonally from the second portion and wherein the second portion is adjacent the flat top portion of the connector.

11. The multi-configuration telecommunications assembly of claim 8, wherein the first portion includes a locking rib structure for engaging with a telecommunications panel.

12. The multi-configuration telecommunications assembly of claim 11, wherein the locking rib structure includes a pair of locking rib structures.

13. The multi-configuration telecommunications assembly of claim 8, wherein the deflectable latch is a unitary structure formed from a metal material.

14. The multi-configuration telecommunications assembly of claim 8, wherein the connector includes a front housing part, defining the jack cavity, and a rear housing part connected to the front housing part and defining the central opening, wherein the deflectable latch is removably mounted to the front housing part.

* * * * *